US012598570B2

(12) United States Patent
Kim et al.

(10) Patent No.: US 12,598,570 B2
(45) Date of Patent: Apr. 7, 2026

(54) WIRELESS COMMUNICATION DEVICE FOR CORRECTING OFFSET BETWEEN BASE STATION AND WIRELESS COMMUNICATION DEVICE AND METHOD OF OPERATING THE SAME

(71) Applicant: Samsung Electronics Co., Ltd., Suwon-si (KR)

(72) Inventors: Joontae Kim, Seoul (KR); Kiil Kim, Yongin-si (KR); Hyunseok Yu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 437 days.

(21) Appl. No.: 17/892,511

(22) Filed: Aug. 22, 2022

(65) Prior Publication Data

US 2022/0394644 A1 Dec. 8, 2022

Related U.S. Application Data

(63) Continuation of application No. 16/795,897, filed on Feb. 20, 2020, now Pat. No. 11,425,674.

(30) Foreign Application Priority Data

Mar. 6, 2019 (KR) ........................ 10-2019-0025865
Jun. 11, 2019 (KR) ........................ 10-2019-0068810

(51) Int. Cl.
*H04W 56/00* (2009.01)
*H04B 17/318* (2015.01)
(Continued)

(52) U.S. Cl.
CPC ........ *H04W 56/005* (2013.01); *H04B 17/318* (2015.01); *H04B 17/336* (2015.01);
(Continued)

(58) Field of Classification Search
CPC .... H04B 7/0617; H04B 7/0695; H04B 7/088; H04B 17/318; H04W 24/10; H04W 56/001; H04W 56/005
(Continued)

(56) References Cited

U.S. PATENT DOCUMENTS 4,691,377 A 9/1987 Yoshihara et al.
7,155,162 B2 12/2006 Doi et al.
(Continued)

FOREIGN PATENT DOCUMENTS

CN 105830357 A 8/2016
CN 107852213 A 3/2018
(Continued)

OTHER PUBLICATIONS

Office Action dated Sep. 9, 2021, issued in corresponding U.S. Appl. No. 16/795,897.
(Continued)

*Primary Examiner* — Harun Chowdhury
(74) *Attorney, Agent, or Firm* — Harness, Dickey & Pierce, P.L.C.

(57) ABSTRACT

A method of operating a wireless communication device for correcting an offset between a base station and the wireless communication device includes determining whether to perform offset correction using a first target synchronization signal block (SSB) to generate a determination result in response to changing a selected reception beam from a first reception beam to a second reception beam in an SSB period, the first target SSB being received via the second reception beam, and performing the offset correction on the second reception beam using at least one first neighbor SSB based on the determination result, the at least one first neighbor SSB being received via the first reception beam.

20 Claims, 16 Drawing Sheets

(51) Int. Cl.

| | |
|---|---|
| *H04B 17/336* | (2015.01) |
| *H04W 24/10* | (2009.01) |
| *H04W 72/044* | (2023.01) |

(52) U.S. Cl.

CPC ......... *H04W 24/10* (2013.01); *H04W 56/001* (2013.01); *H04W 72/046* (2013.01)

(58) Field of Classification Search

USPC ........................................ 370/329, 336, 503

See application file for complete search history.

(56) References Cited

U.S. PATENT DOCUMENTS

| | | | | |
|---|---|---|---|---|
| 8,831,533 | B2 | 9/2014 | Jun et al. | |
| 9,014,311 | B1 | 4/2015 | Cudak et al. | |
| 9,337,969 | B2 | 5/2016 | Raghavan et al. | |
| 10,277,349 | B1 * | 4/2019 | Kotecha | H04B 7/0695 |
| 10,291,456 | B2 | 5/2019 | Kang et al. | |
| 10,523,304 | B2 | 12/2019 | Jung et al. | |
| 10,911,291 | B2 | 2/2021 | Ko et al. | |
| 10,917,185 | B2 | 2/2021 | Yoon et al. | |
| 11,071,075 | B2 | 7/2021 | Choi et al. | |
| 2011/0026648 | A1 * | 2/2011 | Swarts | H04L 27/2675 |
| | | | | 375/343 |
| 2012/0184224 | A1 | 7/2012 | Jun et al. | |
| 2017/0311276 | A1 | 10/2017 | Tsai et al. | |
| 2018/0192384 | A1 | 7/2018 | Chou et al. | |
| 2018/0324678 | A1 | 11/2018 | Chen et al. | |
| 2019/0357159 | A1 * | 11/2019 | Pan | H04W 56/001 |
| 2020/0053712 | A1 * | 2/2020 | Josan | H04B 7/0617 |
| 2020/0067581 | A1 | 2/2020 | Osawa et al. | |
| 2020/0186232 | A1 * | 6/2020 | Levitsky | H04B 7/0617 |

FOREIGN PATENT DOCUMENTS

| | | | |
|---|---|---|---|
| CN | 108243125 | A | 7/2018 |
| CN | 108702232 | A | 10/2018 |
| KR | 10-2018-0038978 | A | 4/2018 |
| KR | 10-2018-0074158 | A | 7/2018 |
| KR | 10-2018-0110341 | | 10/2018 |
| KR | 10-2019-0018659 | A | 2/2019 |
| WO | WO-2017/180803 | A2 | 10/2017 |
| WO | WO-2018034703 | A1 * | 2/2018 |
| WO | WO-2018/084135 | A1 | 5/2018 |
| WO | WO-2018/231014 | A1 | 12/2018 |

OTHER PUBLICATIONS

Notice of Allowance dated Apr. 18, 2022, issued in corresponding U.S. Appl. No. 16/795,897.

Notice of Allowance dated Nov. 16, 2023 issued in related Korean Patent Application No. 10-2019-0068810.

Office Action dated Dec. 9, 2023 issued in related Chinese Patent Application No. 202010140005.X.

\* cited by examiner

| RECEPTION BEAM INDEX | SNR or RSRP |
|:---:|:---:|
| RX_B1 | V1,8 |
| RX_B2 | V2,8 |
| ⋮ | ⋮ |
| RX_Bp | Vp,8 |

TB_SSBn

TB_SSBh

TB_SSB1

S233

GENERATE OFFSET DIFFERENCES
CORRESPONDING TO NEIGHBOR SSBs — S235_1c

APPLY OFFSET DIFFERENCES TO FREQUENCY
OFFSETS CORRESPONDING TO NEIGHBOR SSBs — S235_2c

PERFORM AUTOMATIC FREQUENCY CONTROL
BASED ON ALTERNATE FREQUENCY OFFSET — S235_3c

END

132

SYMBOL TIMING RECOVERY CONTROLLER

132a

NEIGHBOR SSB DETERMINATOR

132b

ALTERNATE SYMBOL TIMING
OFFSET GENERATOR

WIRELESS COMMUNICATION DEVICE FOR CORRECTING OFFSET BETWEEN BASE STATION AND WIRELESS COMMUNICATION DEVICE AND METHOD OF OPERATING THE SAME

CROSS-REFERENCE TO RELATED APPLICATIONS

This application is a continuation of U.S. application Ser. No. 16/795,897, filed Feb. 20, 2020, and claims the benefit of Korean Patent Application Nos. 10-2019-0025865 filed on Mar. 6, 2019, and 10-2019-0068810 filed on Jun. 11, 2019, in the Korean Intellectual Property Office, the disclosures of which are incorporated herein in their entirety by reference.

BACKGROUND

The inventive concepts relate to a wireless communication device for correcting an offset caused by a carrier frequency difference and/or a time synchronization error between the wireless communication device and a base station, and a method of operating the same.

As new radio access technology, recent 5th generation (5G) communication systems aim to provide data services at an ultrahigh speed of several Gbps using an ultra-wideband with a bandwidth of 100 MHz or more, compared to existing long term evolution (LTE) and LTE advanced (LTE-A) communication systems. However, since it is difficult to secure an ultra-wideband frequency of 100 MHz or more in a frequency band of several hundreds of MHz or several GHz used for LTE and LTE-A, 5G communication systems consider a method of transmitting a signal using a wide frequency band in a frequency band of 6 GHz or more. Specifically, it is considered to increase a transmission rate using a millimeter-wave band, such as a 28 GHz band or a 60 GHz band, in 5G communication systems. However, the size of a frequency band is proportional to the path loss of the corresponding radio waves, and the path loss of radio waves is considerable in an ultrahigh frequency, thus reducing a service area of 5G communication systems.

To overcome the reduction in the service area, beamforming, which increases the propagation range of radio waves by generating directional beams using a plurality of antennas, is considered as a significant technique in 5G communication systems. The beamforming technique may be applied to each of a transmitter (e.g., a base station) and a receiver (e.g., a terminal), and may not only increase the service area but also reduce interference due to physical beam concentration in a target direction.

Since the effect of the beamforming technique is enhanced only when the direction of a transmission beam of a transmitter is tuned to the direction of a reception beam of a receiver in 5G communication systems, a technique of selecting an optimal or desirable transmission beam and/or an optimal or desirable reception beam would be advantageous.

SUMMARY

The inventive concepts provide a wireless communication device for increasing communication performance by continuously performing offset correction while selecting a reception beam optimally or desirably tuned to a certain base station in a wireless communication system and a method of operating the wireless communication device.

According to an aspect of the inventive concepts, there is provided a method of operating a wireless communication device for correcting an offset between a base station and the wireless communication device including determining whether to perform offset correction using a first target synchronization signal block (SSB) to generate a determination result in response to changing a selected reception beam from a first reception beam to a second reception beam in an SSB period, the first target SSB being received via the second reception beam, and performing the offset correction on the second reception beam using at least one first neighbor SSB based on the determination result, the at least one first neighbor SSB being received via the first reception beam.

According to an aspect of the inventive concepts, there is provided a method of operating a wireless communication device which communicates with a base station via a selected beam pair including a selected transmission beam and a selected reception beam including receiving a plurality of neighbor synchronization signal blocks (SSBs) from the base station via the selected reception beam, the plurality of neighbor SSBs being transmitted via a subset of a plurality of transmission beams, the subset of the plurality of transmission beams not including the selected transmission beam, the selected reception beam being a first reception beam among a plurality of reception beams, and the selected transmission beam being a first transmission beam among the plurality of transmission beams, receiving a target SSB via a second reception beam among the plurality of reception beams in response to changing the selected reception beam from the first reception beam to the second reception beam, the target SSB being transmitted via the first transmission beam, and performing at least one of automatic frequency control or symbol timing recovery on the second reception beam using the plurality of neighbor SSBs.

According to an aspect of the inventive concepts, there is provided a wireless communication device including a plurality of antennas configured to receive a radio frequency (RF) signal from a base station via a plurality of reception beams, a local oscillator configured to generate an oscillation signal having a local oscillation frequency, and processing circuitry configured to generate a baseband signal using the RF signal and the oscillation signal, the baseband signal including a target synchronization signal block (SSB) received via a first reception beam among the plurality of reception beams and at least one neighbor SSB received via a second reception beam among the plurality of reception beams in response to a selected reception beam changing from the first reception beam to the second reception beam, and determine whether to perform an automatic frequency control on the local oscillation frequency using the at least one neighbor SSB based on a determination result.

BRIEF DESCRIPTION OF THE DRAWINGS

Embodiments of the inventive concepts will be more clearly understood from the following detailed description taken in conjunction with the accompanying drawings in which:

FIG. 2 is a diagram for explaining a synchronization signal including synchronization signal blocks (SSBs) received from a base station;

FIG. 5 is a diagram for explaining the operation of the automatic frequency controller of FIG. 4;

FIGS. 6A and 6B are diagrams for explaining a method of determining a neighbor SSB, according to an example embodiment;

DETAILED DESCRIPTION

Hereinafter, embodiments will be described in detail with reference to the accompanying drawings.

Figure 1:
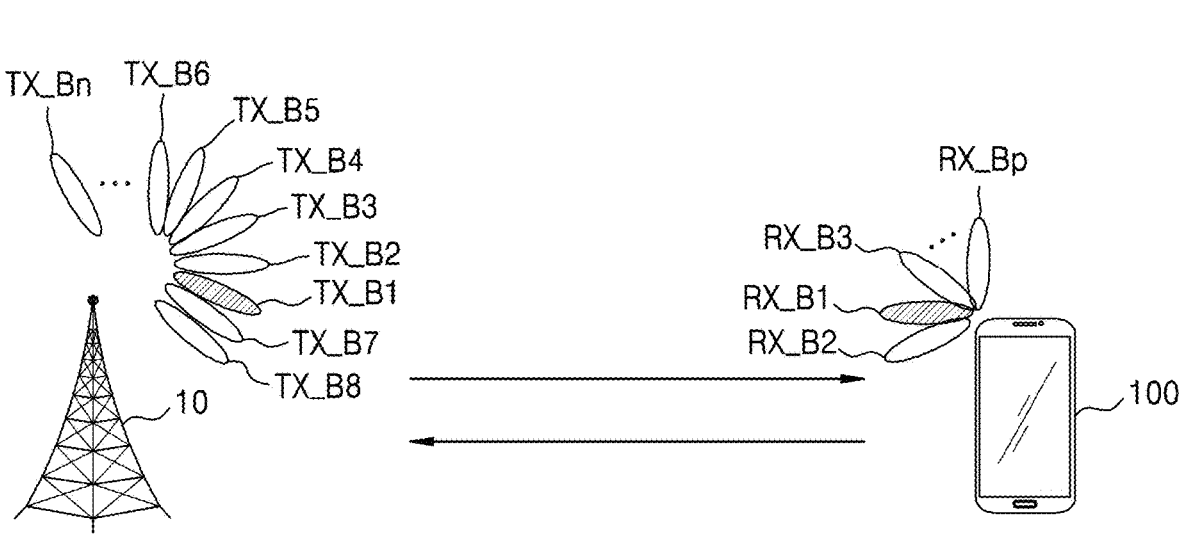
FIG. 1 is a diagram of a wireless communication system according to an example embodiment.
Figure 2:
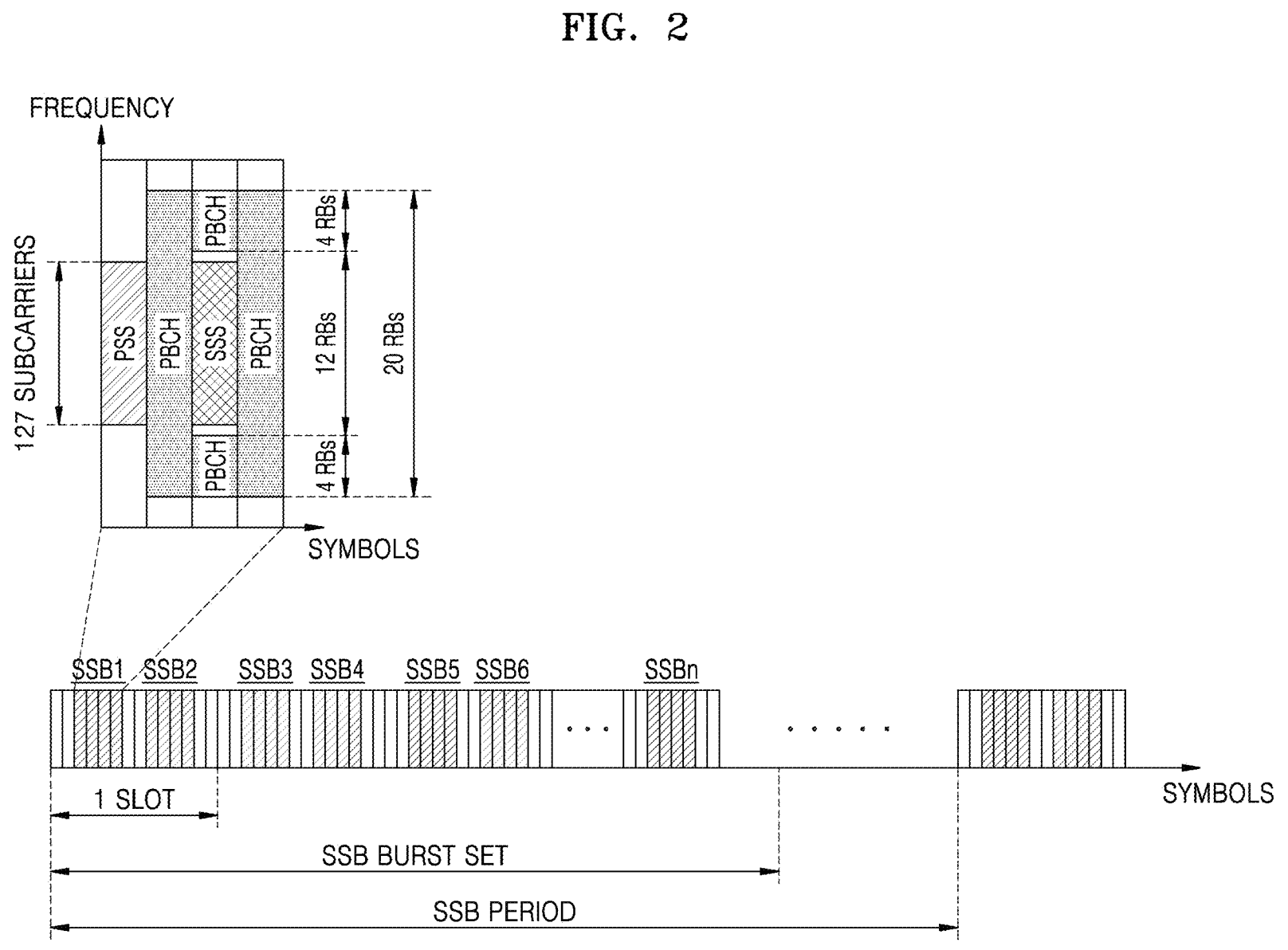

FIG. 1 is a diagram of a wireless communication system 1 according to an example embodiment, and FIG. 2 is a diagram for explaining a synchronization signal including synchronization signal blocks (SSBs) received from a base station.

Referring to FIG. 1, the wireless communication system 1 may include a base station 10 and/or a wireless communication device 100. Although it is illustrated in FIG. 1 that the wireless communication system 1 includes only one base station 10 for convenience of description, it is just an example embodiment, and the wireless communication system 1 may include more base stations. The inventive concepts described below may be applied to other base stations.

The wireless communication device 100 may access the wireless communication system 1 by transmitting and/or receiving signals to and/or from the base station 10. The wireless communication system 1 accessible by the wireless communication device 100 may be referred to as radio access technology (RAT). As a non-limiting example, the wireless communication system 1 may be a wireless communication system, such as a 5th generation (5G) communication system, a long term evolution (LTE) communication system, an LTE advanced (LTE-A) communication system, a code division multiple access (CDMA) communication system, and/or a global system for mobile (GSM) communication system, using a cellular network, a wireless local area network (WLAN) communication system, and/or another wireless communication system. Hereinafter, it is assumed that the wireless communication system 1 accessed by the wireless communication device 100 is a 5G communication system, but example embodiments are not limited thereto, and it is apparent that the inventive concepts may be applied to next generation wireless communication systems.

Wireless communication networks of the wireless communication system 1 may support communication among a plurality of wireless communication devices including the wireless communication device 100 by sharing available network resources. For example, information may be transferred through wireless communication networks in various multiple access modes such as a CDMA mode, a frequency division multiple access (FDMA) mode, a time division multiple access (TDMA) mode, an orthogonal FDMA (OFDMA) mode, a single carrier FDMA (SC-FDMA) mode, an OFDM-FDMA mode, an OFDM-TDMA mode, and/or an OFDM-CDMA mode.

The base station 10 may generally refer to a fixed station that may communicate with the wireless communication device 100 and/or another base station, and may exchange data and/or control information with the wireless communication device 100 and/or another base station. For example, the base station 10 may be referred to as a node B, an evolved-node B (eNB), a next generation node B (gNB), a sector, a site, a base transceiver system (BTS), an access point (AP), a relay node, a remote radio head (RRH), a radio unit (RU), a cell, and/or a small cell. In this specification, a base station may be interpreted as referring or corresponding to a partial area and/or function, which is covered by a base station controller (BSC) in CDMA, a node-B in wideband CDMA (WCDMA), and/or an eNB or a sector (or site) in LTE, in a comprehensive sense and may include various coverage regions, such as a mega cell, a macro cell, a micro cell, a pico cell, a femto cell, a relay node, an RRH, an RU, and/or a small-cell communication range.

The wireless communication device 100 may be stationary or mobile as user equipment (UE) and may refer to a wireless communication device that may transmit and/or receive data and/or control information to and/or from a base station. For example, the wireless communication device 100 may be referred to as a mobile station (MS), a mobile terminal (MT), a user terminal (UT), a subscriber station (SS), a wireless device, a portable device, and/or a terminal.

Referring to FIG. 1, the wireless communication device 100 may be connected to the base station 10 through a wireless channel and may provide various communication services. The base station 10 may service all or some user traffic through a shared channel, may gather state information, such as a buffer state, an available transmission power state, and/or a channel state, and/or may perform scheduling. The wireless communication system 1 may support beamforming using OFDM as a wireless access technique. In addition, the wireless communication system 1 may support an adaptive modulation and coding (AMC) scheme in which a modulation scheme and a channel coding rate may be determined according to the channel state of the wireless communication device 100.

The wireless communication system 1 may transmit and/or receive signals using a wide frequency band in a frequency band of 6 GHz or more. For example, the wireless communication system 1 may increase a data transmission rate using a millimeter-wave band such as a 28 GHz band or a 60 GHz band. Since signal attenuation per distance is relatively large in the millimeter-wave band, the wireless communication system 1 may support transmission and/or reception based on a directional beam, which is generated using multiple antennas, to secure or improve coverage. The wireless communication system 1 may perform beam sweeping for the transmission and/or reception based on a directional beam.

Beam sweeping is a process in which the wireless communication device 100 and the base station 10 may sequentially or randomly sweep directional beams having a certain pattern and may determine a transmission beam and a reception beam having directions that are in tune with each other. The transmission beam and the reception beam having directions that are in tune with each other may be determined as a transmission/reception beam pair (may also be referred to as a "beam pair"). At this time, the transmission beam and the reception beam selected as being in tune with each other as a result of the beam sweeping may be referred to as a best transmission beam (may also be referred to as a "selected transmission beam") and a best reception beam (may also be referred to as a "selected reception beam"), respectively (may collectively be referred to as a "selected beam pair"). A beam pattern may be the shape of a beam, which is determined by the width and direction of the beam. Hereinafter, it is assumed that, as a result of the beam sweeping, a first reception beam RX_B1 is determined as the best reception beam among a plurality of first through p-th reception beams RX_B1 through RX_Bp (e.g., the first RX_B1, the second RX_B2, the third RX_B3, . . . , the p-th RX_Bp) of the wireless communication device 100 and a first transmission beam TX_B1 is determined as the best transmission beam among a plurality of transmission beams TX_B1 through TX_Bn (e.g., the first TX_B1, the second TX_B2, the third TX_B3, the fourth TX_B4, the fifth TX_B5, the sixth TX_B6, the seventh TX_B7, the eighth TX_B8, . . . , the n-th TX_Bn) of the base station 10. Afterwards, the wireless communication device 100 may sweep other reception beams than the first reception beam RX_B1 to select a new best reception beam (also referred to herein as "changing" from a first reception beam to a second reception beam) according to a variable communication environment of the wireless communication device 100 (e.g., a change in a communication environment due to a movement of the wireless communication device 100) and may periodically receive a plurality of SSBs transmitted from the base station 10 via the transmission beams TX_B1 through TX_Bn.

Referring to FIGS. 1 and 2, the base station 10 may transmit a signal including one of first through n-th SSBs SSB1 through SSBn (e.g., the first SSB SSB1, the second SSB SSB2, the third SSB SSB3, the fourth SSB SSB4, the fifth SSB SSB5, the sixth SSB SSB6, . . . , the n-th SSB SSBn) to the wireless communication device 100 via one of the transmission beams TX_B1 through TX_Bn. For example, the base station 10 may transmit a signal including the first SSB SSB1 to the wireless communication device 100 via the first transmission beam TX_B1 and transmit a signal including the second SSB SSB2 to the wireless communication device 100 via the second transmission beam TX_B2. In this manner, the base station 10 may transmit various SSBs, e.g., SSB1 through SSBn, to the wireless communication device 100 via the transmission beams TX_B1 through TX_Bn, and the wireless communication device 100 may continuously perform an operation of updating a best reception beam (e.g., a selected reception beam), which is optimally or desirably tuned to a best transmission beam (e.g., a selected transmission beam), using the first through n-th SSBs SSB1 through SSBn.

Referring to FIG. 2, an SSB may include a primary synchronization signal (PSS), a secondary synchronization signal (SSS), and/or a physical broadcast channel (PBCH). For example, an SSB may include four symbols, and each of a PSS, an SSS, and a PBCH may be located at a position corresponding to certain resource blocks (RBs) in a frequency-axis direction. In addition, an RB may include 12 consecutive subcarriers. For example, a PSS corresponding to a first symbol may be transmitted to the wireless communication device 100 through 127 subcarriers.

For example, two SSBs may be allocated to a slot of a signal, and the wireless communication device 100 may receive an SSB burst set from the base station 10 during a certain SSB period. For example, assuming that the wireless communication system 1 is a new radio (NR) system using a subcarrier spacing of 15 kHz, the wireless communication device 100 may receive an SSB burst set including "n" SSBs, e.g., SSB1 through SSBn, from the base station 10 during an SSB period. At this time, the length of a single slot may be 1 ms and the SSB period may be 20 ms. However, this is just an example embodiment, and embodiments are not limited thereto. The number of SSBs in the SSB burst set, the SSB period, and/or the length of a single slot may vary with the size of a subcarrier spacing, the period of a synchronization signal set in the base station 10, and/or the like.

The wireless communication device 100 may receive the first through n-th SSBs SSB1 through SSBn from the base station 10. Hereinafter, an SSB transmitted from the base station 10 via the best transmission beam is defined as a target SSB. For example, when the best transmission beam is the first transmission beam TX_B1, the target SSB may be the first SSB SSB1.

According to an example embodiment, the wireless communication device 100 may continuously perform an operation of correcting an offset caused by a carrier frequency difference and/or a time synchronization error between the wireless communication device 100 and the base station 10 while performing sweeping to update the best reception beam. In an embodiment, the operation of correcting an offset may include an automatic frequency control for correcting a frequency offset between the base station 10 and the wireless communication device 100 and/or a symbol timing recovery for correcting a symbol timing offset between the base station 10 and the wireless communication device 100.

The operation of the wireless communication device 100 according to an example embodiment will be described assuming that the best transmission beam is the first transmission beam TX_B1 and the best reception beam is the first reception beam RX_B1, as described above.

The wireless communication device 100 may change the first reception beam RX_B1 to the second reception beam RX_B2 at a point within a certain SSB period (e.g., a random, set or determined point) to update the best reception beam and may determine whether to perform offset correction on the second reception beam RX_B2 using the target SSB, e.g., the first SSB SSB1, received via the second reception beam RX_B2. In other words, the wireless communication device 100 may perform offset correction on the first reception beam RX_B1 using SSBs received via the first reception beam RX_B1 within the certain SSB period and, when the first reception beam RX_B1 is changed to the second reception beam RX_B2 (e.g., when the selected reception beam is changed from the first reception beam RX_B1 to the second reception beam RX_B2), the wireless communication device 100 may determine whether to perform offset correction on the second reception beam RX_B2 using the target SSB, e.g., the first SSB SSB1, received via the second reception beam RX_B2. Hereinafter, offset correction on a specific reception beam may be interpreted as offset correction performed based on a signal received via the specific reception beam.

The wireless communication device 100 may perform offset correction on the second reception beam RX_B2 selectively using one of a target SSB and/or a neighbor SSB based on the determination result. The neighbor SSB may be used instead of the target SSB for offset correction and may be an SSB that is received via the best reception beam (e.g., the first reception beam RX_B1) before sweeping. A method of determining a neighbor SSB will be described in detail with reference to FIGS. 6A and 6B below.

According to embodiments, even at the time when the first reception beam RX_B1 is changed to the second reception beam RX_B2, the wireless communication device 100 may continuously (e.g., repeatedly) perform offset correction on the second reception beam RX_B2, following the offset correction on the first reception beam RX_B1.

According to an example embodiment, the wireless communication device 100 may generate (or measure, or determine) a reception quality with respect to the target SSB, e.g., the first SSB SSB1, compare the reception quality with a reference quality, and determine to perform offset correction on the second reception beam RX_B2 using the target SSB, e.g., the first SSB SSB1, when the reception quality is equal to or higher than the reference quality. When the reception quality for the target SSB, e.g., the first SSB SSB1, is lower than the reference quality, the wireless communication device 100 may determine to perform offset correction on the second reception beam RX_B2 using at least one neighbor SSB. In other words, when the reception quality for the target SSB, e.g., the first SSB SSB1, received via the second reception beam RX_B2 is not satisfactory, the wireless communication device 100 may perform offset correction on the second reception beam RX_B2 using at least one neighbor SSB instead of the target SSB, e.g., the first SSB SSB1. In addition, the reception quality of an SSB may include at least one selected from a reference signal received power (RSRP) of the SSB and/or a signal-to-noise ratio (SNR) of the SSB. According to some example embodiments, the RSRP and/or the SNR of each SSB may be determined using structures and/or methods known to a person having ordinary skill in the art. However, this is just an example embodiment, and embodiments are not limited thereto. The wireless communication device 100 may generate the reception quality of an SSB based on various matrices that may indicate the reception quality.

Figure 3:
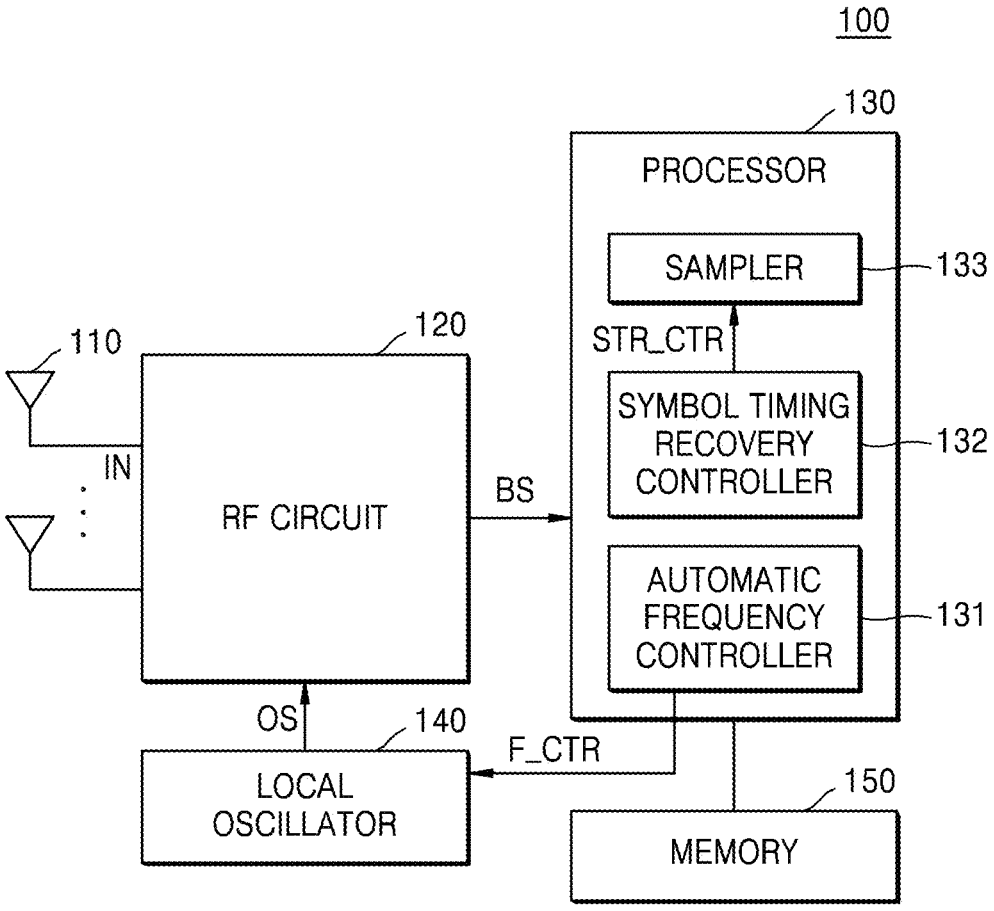
FIG. 3 is a block diagram of a wireless communication device according to an example embodiment.

According to an example embodiment, the wireless communication device 100 may continuously perform offset correction selectively using one of a target SSB and/or a neighbor SSB even while operating to update the best reception beam that is in optimal or desired tune with the best transmission beam, thereby increasing communication performance FIG. 3 is a block diagram of the wireless communication device 100 according to an example embodiment.

Referring to FIG. 3, the wireless communication device 100 may include a plurality of antennas 110, a radio frequency (RF) circuit 120, a processor 130, a local oscillator 140, and/or a memory 150. According to an example embodiment, the processor 130 may include an automatic frequency controller 131, a symbol timing recovery controller 132, and/or a sampler 133. Although not shown, the processor 130 may further include another element, e.g., an analog-to-digital converter. According to some example embodiments, operations described herein as being performed by the base station 10, the wireless communication device 100, the RF circuit 120, the processor 130, the local oscillator 140, the automatic frequency controller 131, the symbol timing recovery controller 132, and/or the sampler 133 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, each of the elements in the wireless communication device 100 (e.g., the RF circuit 120, the processor 130, and/or the local oscillator 140) may be implemented as a hardware block including an analog circuit and/or a digital circuit or a software block including a plurality of instructions executed by at least one processor and/or the like. In some embodiments, the automatic frequency controller 131 and/or the symbol timing recovery controller 132 may be implemented in a modem chip.

The wireless communication device 100 may receive a signal from a base station through a downlink channel. The characteristics of the downlink channel may be changed by the states and/or circumstances of the wireless communication device 100 and/or the base station. In other words, an offset between the wireless communication device 100 and the base station may occur with respect to communication parameters due to a carrier frequency difference and/or a time synchronization error therebetween. The wireless communication device 100 may perform an operation of correcting such an offset to increase or improve communication performance.

The RF circuit 120 may receive an input signal IN from a base station through the antennas 110 and receive an oscillation signal OS from the local oscillator 140. The RF circuit 120 may generate a baseband signal BS from the input signal IN and the oscillation signal OS and output the baseband signal BS to the processor 130. Here, the input signal IN may be an RF signal that has a high central frequency due to a carrier (or corresponding to a carrier frequency), and the oscillation signal OS may have a local oscillation frequency corresponding to the carrier (e.g., corresponding to the carrier frequency). For example, the RF circuit 120 may include an analog down-conversion mixer and may generate the baseband signal BS by down-converting the frequency of the input signal IN. When the local oscillation frequency does not coincide with the carrier frequency of the input signal IN, a frequency offset may occur.

According to an example embodiment, the automatic frequency controller 131 may correct a frequency offset between the base station 10 and the wireless communication device 100 selectively using one of a target SSB and/or a neighbor SSB during an operation of updating the best reception beam. In some embodiments, the target SSB and the neighbor SSB may be received in one SSB period. In detail, when a first reception beam is changed to a second reception beam as a result of updating the best reception beam, the automatic frequency controller 131 may select one of a target SSB and/or a neighbor SSB and generate (or estimate) a frequency offset with respect to the input signal IN received via the second reception beam. The automatic frequency controller 131 may generate a frequency control signal F_CTR, which makes the local oscillation frequency of the oscillation signal OS coincide with the carrier frequency of the input signal IN, based on the frequency offset. Specific embodiments of the automatic frequency controller 131 will be described with reference to FIGS. 4 through 10C below.

A symbol timing offset may occur when symbol timing for data sampling in a base station does not coincide with symbol timing for data sampling in the wireless communication device 100.

According to an example embodiment, the symbol timing recovery controller 132 may correct a symbol timing offset between the base station 10 and the wireless communication device 100 selectively using one of a target SSB and/or a neighbor SSB during an operation of updating the best reception beam. In detail, when a first reception beam is changed to a second reception beam as a result of updating the best reception beam, the symbol timing recovery controller 132 may select one from a target SSB and/or a neighbor SSB and generate (or estimate) a symbol timing offset with respect to the input signal IN received via the second reception beam. The symbol timing recovery controller 132 may generate a symbol timing recovery control signal STR_CTR, which makes the symbol timing of the base station 10 coincide with the symbol timing of the wireless communication device 100, based on the symbol timing offset, and may output the symbol timing recovery control signal STR_CTR to the sampler 133. Specific embodiments of the symbol timing recovery controller 132 will be described with reference to FIGS. 12 through 13B below.

The memory 150 may store data that may be used when the automatic frequency controller 131 and the symbol timing recovery controller 132 perform operations according to example embodiments. According to some example embodiments, the memory 150 may be implemented using a Random Access Memory (RAM), a flash memory, a Read Only Memory (ROM), an Electrically Programmable ROM (EPROM), an Electrically Erasable Programmable ROM (EEPROM), registers, a hard disk, a removable disk, a CD ROM, and/or any other form of storage medium known in the art.

Figure 4:
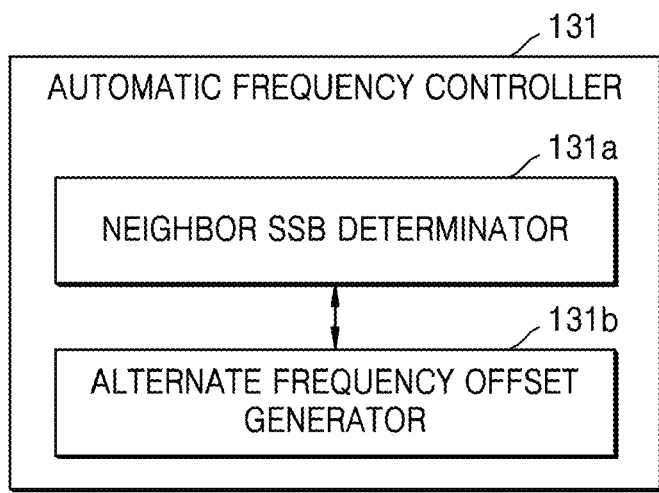
FIG. 4 is a block diagram of an automatic frequency controller according to an example embodiment.
Figure 5:
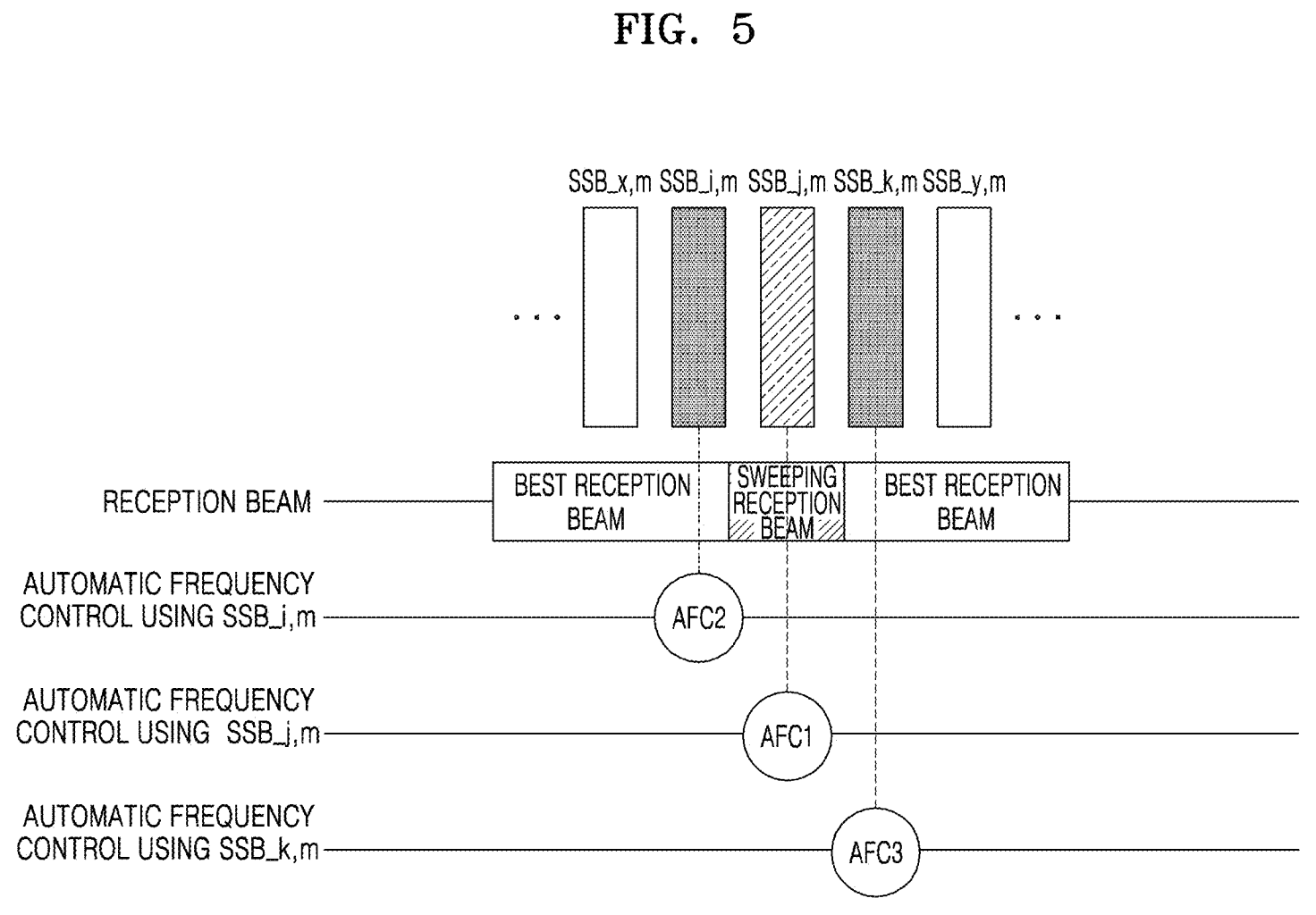

FIG. 4 is a block diagram of the automatic frequency controller 131 according to an example embodiment and FIG. 5 is a diagram for explaining the operation of the automatic frequency controller 131 of FIG. 4.

Referring to FIG. 4, the automatic frequency controller 131 may include a neighbor SSB determinator 131a and/or an alternate frequency offset generator 131b. The neighbor SSB determinator 131a may determine at least one neighbor SSB, which may be used instead of the target SSB to perform frequency offset correction, from a plurality of SSBs received within a certain SSB period. A specific embodiment of the neighbor SSB determinator 131a will be described with reference to FIGS. 6A and 6B below. According to some example embodiments, operations described herein as being performed by the neighbor SSB determinator 131a and/or the alternate frequency offset generator 131b may be performed by processing circuitry.

The alternate frequency offset generator 131b may generate an alternate frequency offset using the neighbor SSB determined by the neighbor SSB determinator 131a. The automatic frequency controller 131 may perform automatic frequency control based on the alternate frequency offset. Specific embodiments of the alternate frequency offset generator 131b will be described with reference to FIGS. 8 through 10C below.

Although the operations of the neighbor SSB determinator 131a and the alternate frequency offset generator 131b have been separately described with reference to FIG. 4 for convenience of description, the operations may be defined as being performed by the automatic frequency controller 131.

In FIG. 5, it is assumed that a j-th SSB SSB_j,m is a target SSB, an i-th SSB SSB_i,m and a k-th SSB SSB_k,m are neighbor SSBs, the best reception beam is a first reception beam, and a reception beam to which the best reception beam is changed via a sweeping reception beam is a second reception beam. The horizontal direction in FIG. 5 does not indicate a time axis. In addition, the illustration in FIG. 5 is just an example, and embodiments are not limited thereto.

Referring to FIG. 5, a wireless communication device may receive a plurality of x-th through y-th SSBs SSB_x,m through SSB_y,m from a base station in an m-th SSB period, where "m" is an integer. In detail, the wireless communication device may receive neighbor SSBs, e.g., the x-th SSB SSB_x,m and the y-th SSB SSB_y,m via the first reception beam and may receive the target SSB, e.g., the j-th SSB SSB_j,m, via the second reception beam. The automatic frequency controller 131 may continuously perform automatic frequency control on the first reception beam based on a frequency offset that is generated using a target SSB received in an SSB period before the m-th SSB period. However, as the first reception beam is changed to the second reception beam (e.g., the best reception beam, initially selected as the first reception beam, is changed, updated and/or re-selected to the second reception beam) in the m-th SSB period, it may be desirable to determine whether the target SSB, e.g., the j-th SSB SSB_j,m, received via the second reception beam is suitable for a first automatic frequency control AFC1.

Accordingly, the automatic frequency controller 131 may determine whether to perform the first automatic frequency control AFC1 on the second reception beam using the target SSB, e.g., the j-th SSB SSB_j,m, when the first reception beam is changed to the second reception beam to update the best reception beam (e.g., in response to the selected reception beam changing from the first reception beam to the second reception beam) in the m-th SSB period. The automatic frequency controller 131 may generate or determine a reception quality of the target SSB, e.g., the j-th SSB SSB_j,m, and determine whether to perform the first automatic frequency control AFC1 based on the reception quality. For example, the automatic frequency controller 131 may perform the first automatic frequency control AFC1 using the target SSB, e.g., the j-th SSB SSB_j,m, when the reception quality of the target SSB, e.g., the j-th SSB SSB_j,m, is equal to or higher than a reference quality. The automatic frequency controller 131 may generate channel estimates using at least one selected from a PSS, an SSS, and/or a PBCH of the target SSB, e.g., the j-th SSB SSB_j,m, and generate a differential correlation result by calculating a differential correlation of the channel estimates. Since a frequency offset exerts nearly the same or a similar influence on all subcarriers throughout the whole bandwidth, the automatic frequency controller 131 may calculate a differential correlation by multiplying a channel estimate of a current time index by a complex conjugate of a channel estimate of a previous time index and accumulating multiplication results. In addition, the automatic frequency controller 131 may calculate a phase estimate from the differential correlation result. Here, the phase estimate may refer to an estimated value of a phase change, and the phase change may be proportional to a frequency offset between a carrier frequency and a local oscillation frequency. In detail, a frequency offset $\Delta f$ may be calculated using Equation 1:

$$\Delta f = \frac{N}{2\pi(N + CP)\delta T}{}^{\angle}\left(\sum_{k=0}^{N_s-1} Y_{m+1}[k]Y_m^*[k]\right) \quad (1)$$

$Y_m[k]$ may be a result of estimating a frequency-domain channel in a resource element, which corresponds to an index of a k-th reference signal in an m-th symbol. $\delta T$ may be a distance between two symbols (for example, when the product of an (m=L)-th symbol and an (m=L+2)-th symbol is calculated, $\delta T$ may be 2), and Ns may be the number of available reference signals. N may be a Fast Fourier Transform (FFT) size, and CP may be the length of a cyclic prefix.

The automatic frequency controller 131 may generate a frequency offset using the target SSB, e.g., the j-th SSB SSB_j,m, based on Equation 1 and perform the first automatic frequency control AFC1 based on the frequency offset.

The automatic frequency controller 131 may perform a second automatic frequency control AFC2 and/or a third automatic frequency control AFC3 using the neighbor SSBs, e.g., the i-th SSB SSB_i,m and/or the k-th SSB SSB_k,m, when the reception quality of the target SSB, e.g., the j-th SSB SSB_j,m, is lower than the reference quality. In some embodiments, the automatic frequency controller 131 may select one of the i-th SSB SSB_i,m and the k-th SSB SSB_k,m and perform an automatic frequency control corresponding to the selected neighbor SSB using the selected neighbor SSB. The automatic frequency controller 131 may generate an alternate frequency offset using the neighbor SSBs, e.g., the i-th SSB SSB_i,m and/or the k-th SSB SSB_k,m, based on Equation 1. Thereafter, the automatic frequency controller 131 may perform the second and/or third automatic frequency controls AFC2 and/or AFC3 based on the alternate frequency offset.

Specific embodiments of the second and third automatic frequency controls AFC2 and AFC3 respectively using the neighbor SSBs, e.g., the i-th SSB SSB_i,m and the k-th SSB SSB_k,m, will be described with reference to FIGS. 8 through 10C below.

Figure 6A:
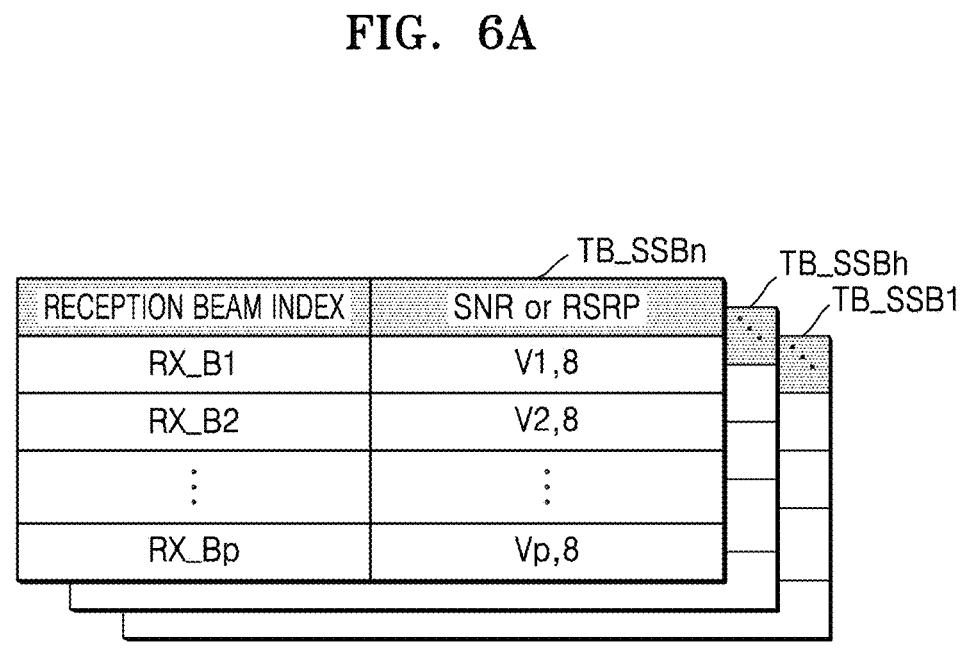
Figure 6B:
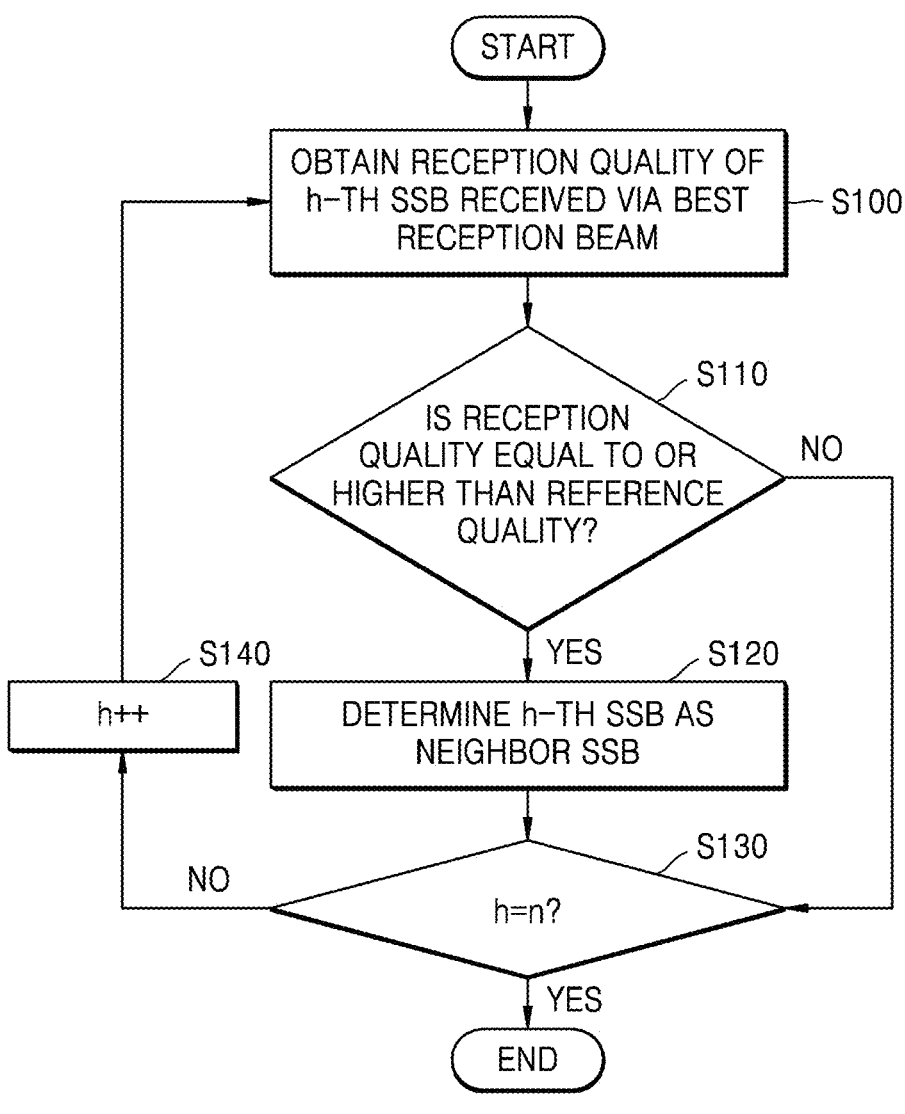

FIGS. 6A and 6B are diagrams for explaining a method of determining a neighbor SSB, according to an example embodiment. FIG. 3 will also be referred to in the description below.

Referring to FIGS. 3 and 6A, the processor 130 may generate a reception quality (e.g., an SNR and/or RSRP) of each of the first through n-th SSBs SSB1 through SSBn, which are received in at least one SSB period before the m-th SSB period of FIG. 5, or a plurality of SSB periods including the m-th SSB periods, with respect to the first through p-th reception beams RX_B1 through RX_Bp. For example, the processor 130 may generate the SNR or RSRP of the n-th SSB SSBn when the n-th SSB SSBn is received via each of the first through p-th reception beams RX_B1 through RX_Bp. An n-th table TB_SSBn may include information about reception quality of the n-th SSB SSBn with respect to the first through p-th reception beams RX_B1 through RX_Bp. In this manner, each of first through (n−1)-th tables TB_SSB1 through TB_SSBn−1 may include information about reception quality of a corresponding one of the first through (n−1)-th SSBs SSB1 through SSBn−1 with respect to the first through p-th reception beams RX_B1 through RX_Bp. The first through n-th tables TB_SSB1 through TB_SSBn may be stored in the memory 150, and the processor 130 may access the memory 150 to refer to the first through n-th tables TB_SSB1 through TB_SSBn.

Referring to FIG. 6B, the automatic frequency controller 131 may obtain a reception quality of the h-th SSB SSBh (where "h" is an integer less than "n"), which is received via the best reception beam, with reference to the first through n-th tables TB_SSB1 through TB_SSBn of FIG. 6A in operation S100. For example, when the best reception beam is the first reception beam RX_B1, the automatic frequency controller 131 may obtain the reception quality of the h-th SSB SSBh corresponding to the first reception beam RX_B1 with reference to the h-th table TB_SSBh. According to some example embodiments, prior to operation S100 in a first iteration, the h may be initialized to have a value of '1'. The automatic frequency controller 131 may determine whether the reception quality is equal to or higher than a reference quality in operation S110. The reference quality may be set using various methods to determine a neighbor SSB. For example, the reference quality may be set based on the reception quality of a target SSB received via the best reception beam.

When the answer is "YES" in operation S110, the h-th SSB SSBh may be determined as the neighbor SSB in operation S120. When the answer is "NO" in operation S110, or after operation S120, the automatic frequency controller 131 may determine whether "h" is equal to "n" in operation S130. When the answer is "NO" in operation S130, "h" is counted up (e.g., incremented) in operation S140, and the method proceeds to operation S100. When the answer is "YES", the automatic frequency controller 131 may perform an automatic frequency control selectively using at least one neighbor SSB.

Figure 7:
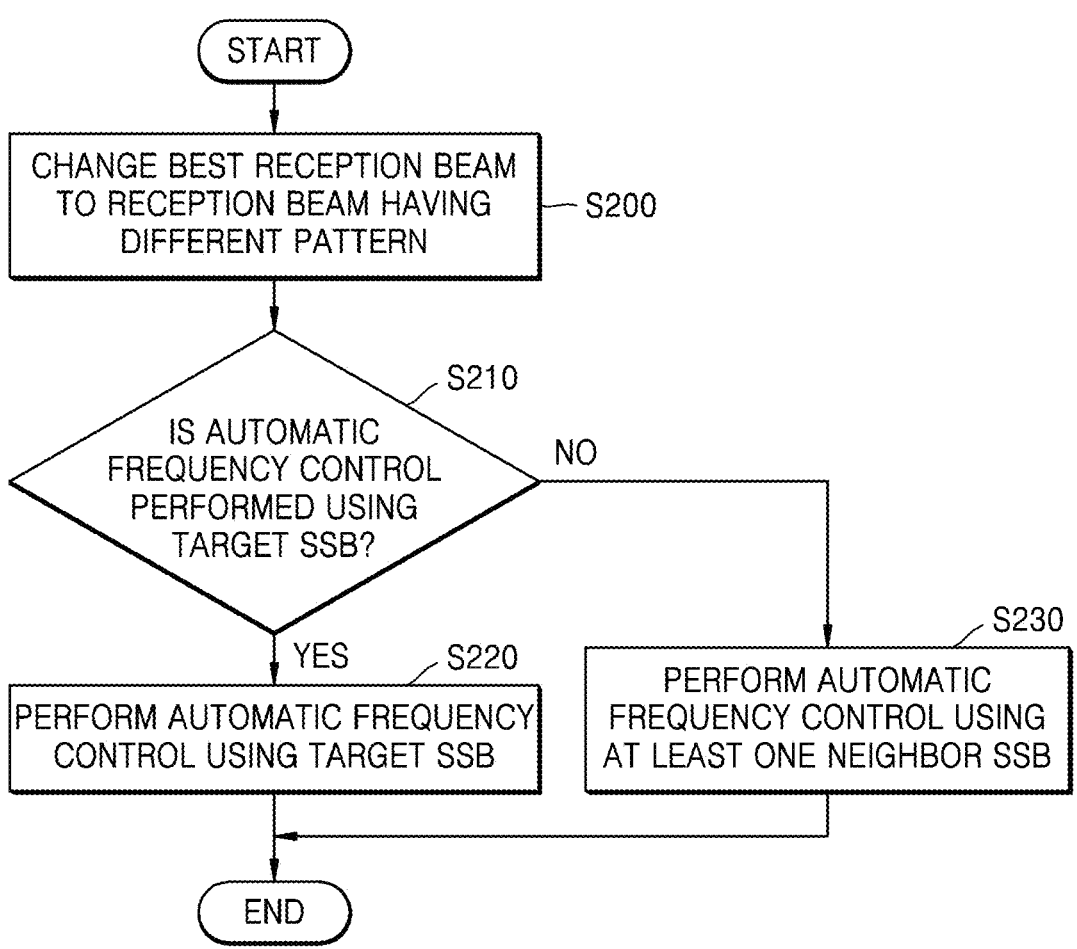
FIG. 7 is a flowchart of a method of operating an automatic frequency controller, according to an example embodiment.

FIG. 7 is a flowchart of a method of operating an automatic frequency controller, according to an example embodiment. FIG. 3 will also be referred to in the description below.

Referring to FIGS. 3 and 7, the automatic frequency controller 131 may change the best reception beam formed in the antennas 110 to a reception beam having a different pattern in operation S200. For example, the automatic frequency controller 131 may change the best reception beam formed in the antennas 110 from a first reception beam to a second reception beam to update the best reception beam. The automatic frequency controller 131 may determine whether to perform automatic frequency control on the second reception beam using a target SSB, which is received via the second reception beam, in operation S210. In an example embodiment, the automatic frequency controller 131 may perform the determination based on whether the reception quality of the target SSB received via the second reception beam is equal to or higher than a reference quality. The reference quality may be set using various methods to determine whether to perform the automatic frequency control using the target SSB.

In an example embodiment, the reference quality may be set based on the reception quality of at least one neighbor SSB in the same SSB period, or a similar SSB period, as the target SSB is received and/or the reception quality of a target SSB received in at least one other SSB period. Referring to FIG. 5 for description in detail, the reference quality may be set based on the reception quality of the neighbor SSBs, e.g., the i-th SSB SSB_i,m and the k-th SSB SSB_k,m, in the m-th SSB period, in which the target SSB, e.g., the j-th SSB SSB_j,m, is received, and the reception quality of a target SSB received in at least one other SSB period (e.g., an (m−1)-th SSB period) before the m-th SSB period. However, this is just an example embodiment, and embodiments are not limited thereto. The reference quality may be set based on various matrices such that whether a frequency offset error caused by using a target SSB received via a changed reception beam is within a tolerance limit.

When the answer is "YES" in operation S210, that is, when the reception quality of the target SSB is equal to or higher than the reference quality, the automatic frequency controller 131 may perform the automatic frequency control using the target SSB in operation S220. Otherwise, when the answer is "NO" in operation S210, that is, when the reception quality of the target SSB is lower than the reference quality, the automatic frequency controller 131 may perform the automatic frequency control using at least one neighbor SSB in operation S230.

Figure 8:
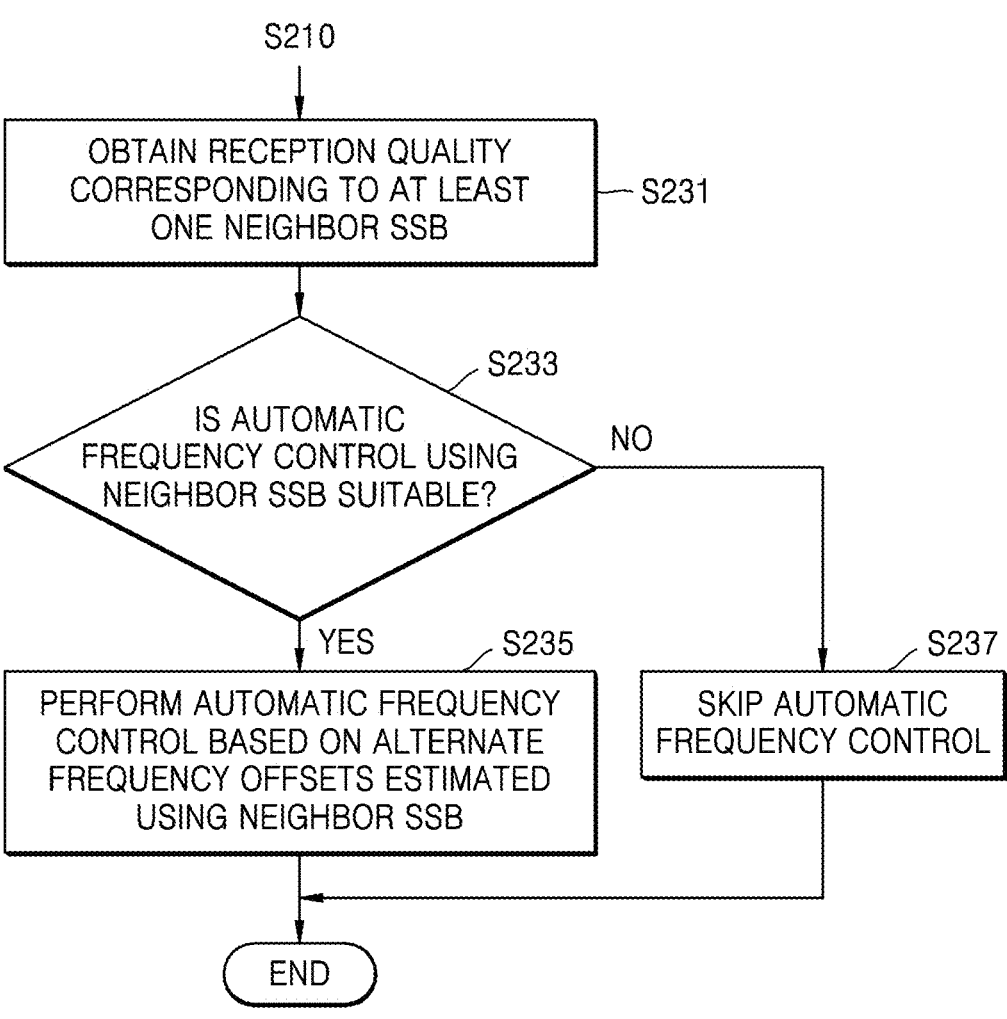
FIG. 8 is a flowchart of a method of operating an automatic frequency controller, according to an example embodiment.

FIG. 8 is a flowchart of a method of operating an automatic frequency controller, according to an example embodiment. FIG. 3 will also be referred to in the description below.

Referring to FIGS. 3 and 8, when it is determined that the automatic frequency control is performed using at least one neighbor SSB after operation S210 in FIG. 7, the automatic frequency controller 131 may obtain a reception quality corresponding to the at least one neighbor SSB in operation S231. For example, the automatic frequency controller 131 may generate (or measure or determine) the reception quality of the neighbor SSB received via the best reception beam. The automatic frequency controller 131 may determine suitability of an automatic frequency control with respect to the neighbor SSB in operation S233. In other words, the automatic frequency controller 131 may determine whether it is suitable to perform the automatic frequency control using the neighbor SSB. In an example embodiment, the automatic frequency controller 131 may determine whether the reception quality of the neighbor SSB is equal to or higher than a reference quality (e.g., a neighbor SSB having a reception quality equal to or higher than the reference quality may be determined to be suitable for use in performing the automatic frequency control). The reference quality may be set using various methods to determine the suitability of an automatic frequency control with respect to the neighbor SSB. In an example embodiment, the reference quality may be set based on a reception quality of at least one neighbor SSB received via the best reception beam in other SSB periods.

When the answer is "YES" in operation S233, that is, when the reception quality of the neighbor SSB is equal to or higher than the reference quality, the automatic frequency controller 131 may perform the automatic frequency control based on alternate frequency offsets generated (or estimated) using the neighbor SSB in operation S235. Otherwise, when the answer is "NO" in operation S233, that is, when the reception quality of the neighbor SSB is lower than the reference quality, the automatic frequency controller 131 may skip the automatic frequency control with respect to a reception beam changed from the best reception beam in operation S237.

Figure 9A:
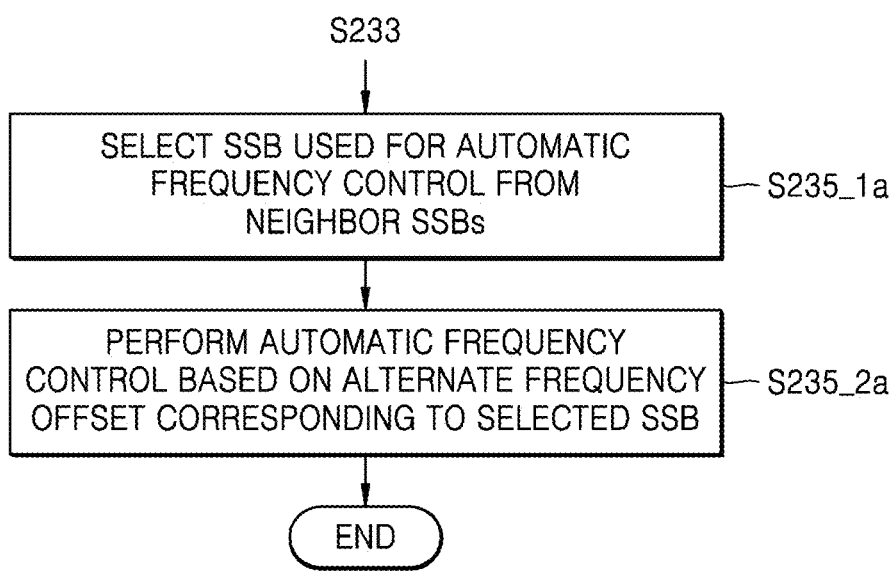
FIGS. 9A and 9B are flowcharts of a method of operating an automatic frequency controller, according to example embodiments.
Figure 9B:
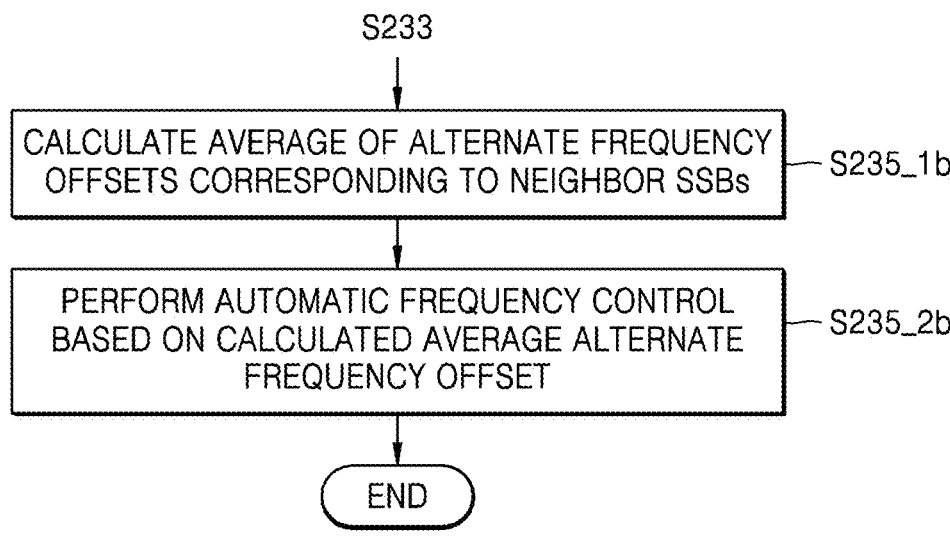

FIGS. 9A and 9B are flowcharts of a method of operating an automatic frequency controller, according to example embodiments. FIG. 3 will also be referred to in the description below.

Referring to FIGS. 3 and 9A, when there are a plurality of neighbor SSBs, the automatic frequency controller 131 may select an SSB to be used for the automatic frequency control from among the neighbor SSBs in operation S235_1aafter operation S233 in FIG. 8. In an example embodiment, the automatic frequency controller 131 may select a neighbor SSB having a highest reception quality among the neighbor SSBs. The automatic frequency controller 131 may perform the automatic frequency control based on an alternate frequency offset corresponding to the selected SSB in operation S235_2a.

Referring to FIG. 9B, when there are a plurality of neighbor SSBs, the automatic frequency controller 131 may calculate an average of alternate frequency offsets corresponding to the neighbor SSBs (to obtain or generate a calculated average alternate frequency offset) in operation S235_1b after operation S233 in FIG. 8. The automatic frequency controller 131 may perform the automatic frequency control based on the calculated average alternate frequency offset in operation S235_2b.

Figure 10A:
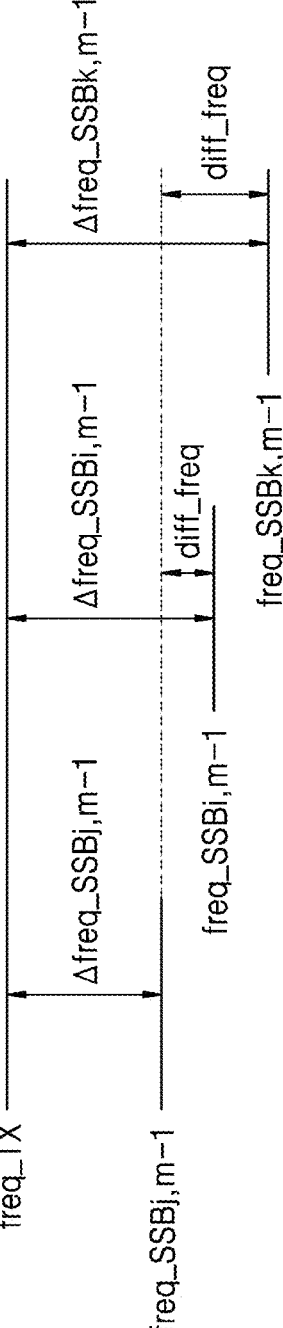
FIGS. 10A through 10C are diagrams for explaining a method of operating an automatic frequency controller, according to an example embodiment.
Figure 10B:
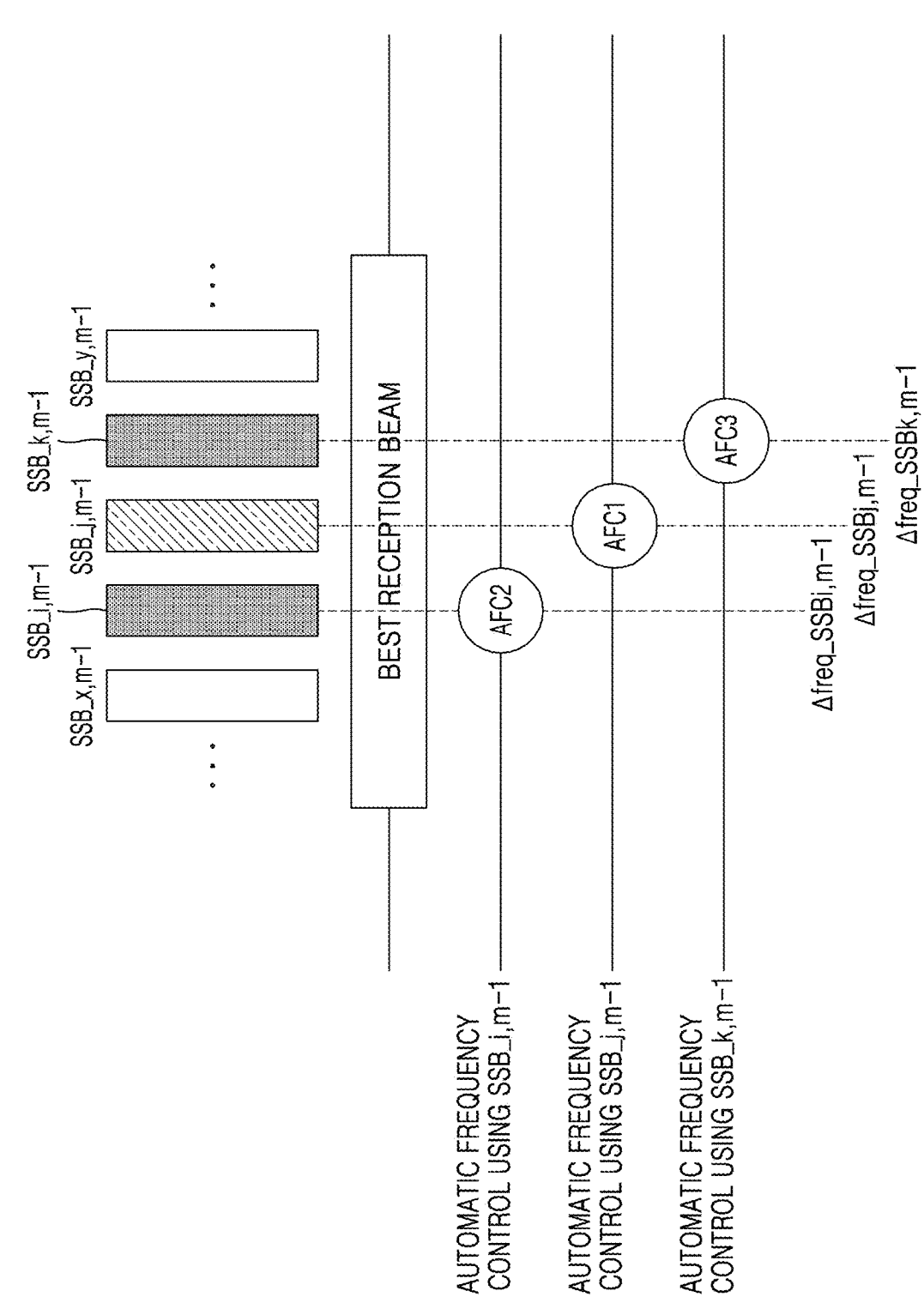
Figure 10C:
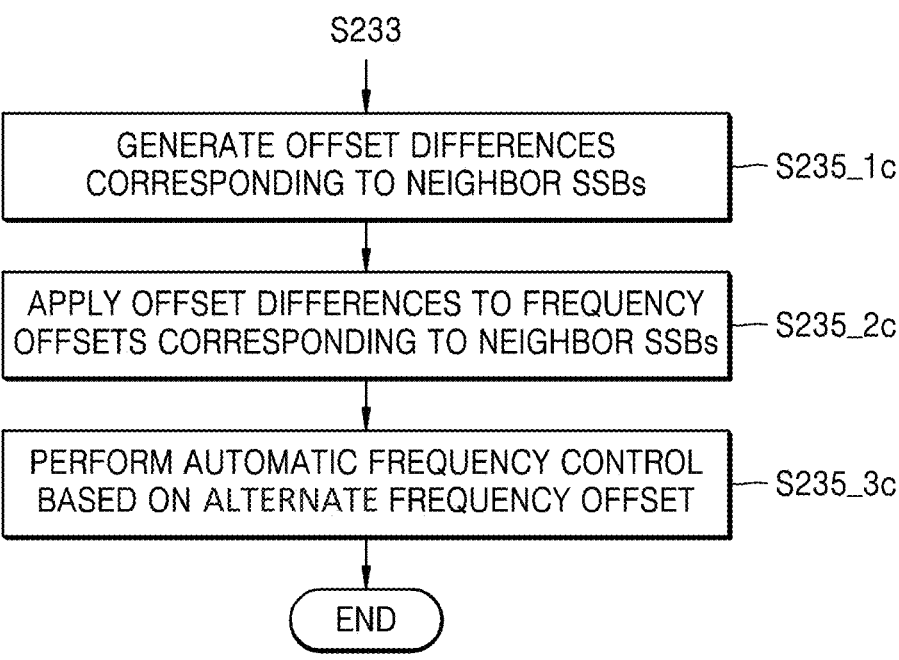

FIGS. 10A through 10C are diagrams for explaining a method of operating an automatic frequency controller, according to an example embodiment. FIG. 3 will also be referred to in the description below.

Referring to FIGS. 10A and 10B, a frequency offset between a transmission frequency freq_TX (or a carrier frequency) of a base station and a local oscillation frequency of the wireless communication device 100 may be different for each SSB (each of the plurality of x-th through y-th SSBs SSB_x,m−1 through SSB_y,m−1). For example, the wireless communication device 100 may receive a target SSB, e.g., a j-th SSB SSB_j,m−1, and neighbor SSBs, e.g., an i-th SSB SSB_i,m−1 and a k-th SSB SSB_k,m−1, from a base station via the best reception beam (e.g., a first reception beam) in the (m−1)-th SSB period before the m-th SSB period; and a frequency offset Δfreq_SSBj,m−1 generated (or estimated) using the target SSB, e.g., the j-th SSB SSB_j,m−1, may be different from frequency offsets Δfreq_SSBi,m−1 and Δfreq_SSBk,m−1 generated (or estimated) using the neighbor SSBs, e.g., the i-th SSB SSB_i, m−1 and the k-th SSB SSB_k,m−1. For example, an i-th offset difference diff_freq_i may be between the frequency offset Δfreq_SSBj,m−1 generated (or estimated) using the target SSB, e.g., the j-th SSB SSB_j,m−1, and the frequency offset Δfreq_SSBi,m−1 generated (or estimated) using the i-th SSB SSB_i,m−1; and a k-th offset difference diff_freq_k may be between the frequency offset Δfreq_SSBj,m−1 generated (or estimated) using the target SSB, e.g., the j-th SSB SSB_j,m−1, and the frequency offset Δfreq_SSBk,m−1 generated (or estimated) using the k-th SSB SSB_k,m−1.

The automatic frequency controller 131 may generate the i-th and k-th offset differences diff_freq_i and diff_freq_k using the frequency offsets Δfreq_SSBj,m−1, Δfreq_SSBi, m−1, and Δfreq_SSBk,m−1, which are generated while performing the first through third automatic frequency controls AFC1 through AFC3.

According to an example embodiment, the automatic frequency controller 131 may generate an offset difference between a frequency offset, which is generated (or estimated) using a target SSB received via the best reception beam in a certain SSB period, and each of frequency offsets, which are respectively generated (or estimated) using neighbor SSBs received via the best reception beam. The automatic frequency controller 131 may reflect the offset differences in an automatic frequency control using at least one SSB selected from neighbor SSBs afterwards. In detail, the automatic frequency controller 131 may use the i-th and k-th offset differences diff_offset_i and diff_offset_k when generating (or estimating) alternate frequency offsets using neighbor SSBs, e.g., the i-th SSB SSB_,m and the k-th SSB SSB_k,m, received in the m-th SSB period in FIG. 5.

Referring to FIG. 10C, after operation S233 in FIG. 8, the automatic frequency controller 131 may generate offset differences corresponding to neighbor SSBs in operation S235_1c. For example, the automatic frequency controller 131 may generate the offset differences from frequency offsets, which are generated (or estimated) using the target SSB received via the best reception beam and the neighbor SSBs in a certain SSB period. The automatic frequency controller 131 may generate an alternate frequency offset by applying the offset differences to the frequency offsets corresponding to the neighbor SSBs in operation S235_2c. In detail, the automatic frequency controller 131 may apply the offset differences using Equation 2:

$$\text{where } \Delta f_{Alternate} = \Delta f_{SSB\_j,m-1} + \frac{\Delta f_{AFC}(\Delta f_{Alternate})}{\sum\limits_{y \in Neighbor\ SSBs} \sigma_{e(y)^{-2}}} \sum\limits_{x \in Neighbor\ SSBs} \frac{e(x)}{\sigma_{e(x)^{-2}}} \qquad (2)$$

$$e(x) = \Delta f_{SSB\_x,m} - \Delta f_{SSB\_x,m-1}$$

In some embodiments, when the quality of $\Delta f_{SSB_{x,m}} - \Delta f_{SSB_{x,m-1}}$ is not known, a simple arithmetic mean may be calculated using Equation 3:

$$\Delta f_{Alternate} = \Delta f_{SSB\_j,m-1} + \frac{1}{|Neighbor\ SSBs|} \sum\limits_{x \in Neighbor\ SSBs} e(x) \qquad (3)$$

When there are a plurality of neighbor SSBs SSB_x, the automatic frequency controller 131 may generate an alternate frequency offset $\Delta f_{Alternate}$ by performing a calculation on a frequency offset $\Delta f_{SSB\_j,m-1}$ corresponding to the target SSB, e.g., the j-th SSB SSB_j,m−1, and a frequency offset $\Delta f_{SSB\_x,m-1}$ corresponding to a neighbor SSB, e.g., the x-th SSB SSB_x,m−1, in the (m−1)-th SSB period (or a random SSB period) and a frequency offset $\Delta f_{SSB\_x,m}$ corresponding to the neighbor SSB, e.g., the x-th SSB SSB_x,m, in the m-th SSB period, based on Equation 2 or 3. The automatic frequency controller 131 may perform an automatic frequency control based on an application result (e.g., the alternate frequency offset $\Delta f_{Alternate}$) in operation S235_3c.

Figure 11:
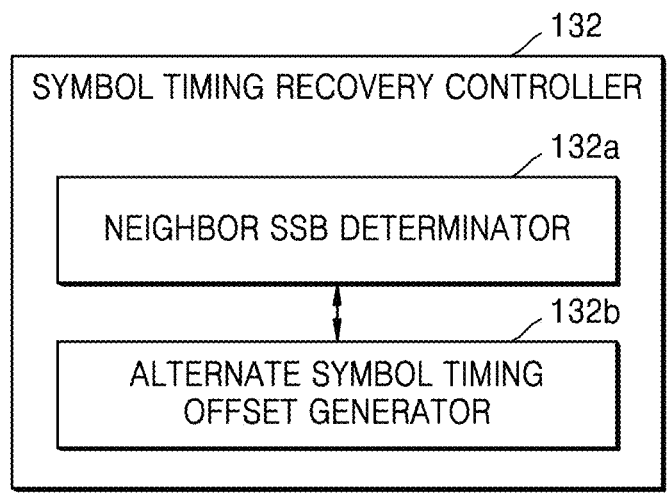
FIG. 11 is a block diagram of a symbol timing recovery controller according to an example embodiment.
Figure 12:
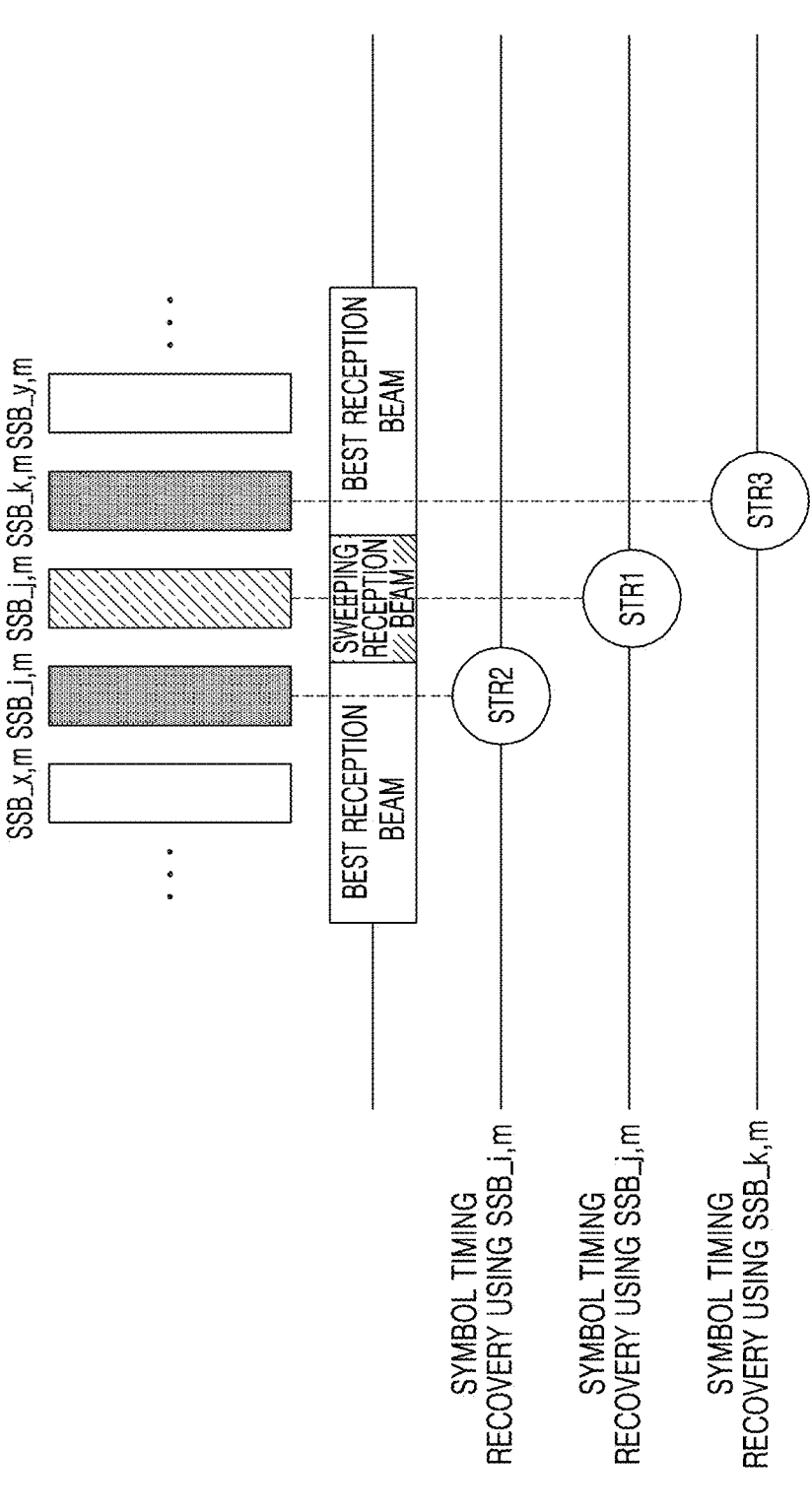
FIG. 12 is a diagram for explaining the operation of the symbol timing recovery controller of FIG. 11.

FIG. 11 is a block diagram of the symbol timing recovery controller 132 according to an example embodiment. FIG. 12 is a diagram for explaining the operation of the symbol timing recovery controller 132 of FIG. 11.

Referring to FIG. 11, the symbol timing recovery controller 132 may include a neighbor SSB determinator 132a and/or an alternate symbol timing offset generator 132b. The neighbor SSB determinator 132a may determine at least one neighbor SSB, which may be used instead of a target SSB to perform symbol timing recovery, from a plurality of SSBs received within a certain SSB period. The method of determining a neighbor SSB discussed in association with FIGS. 6A and 6B performed by the neighbor SSB determinator 131a of FIG. 4 may also be performed by the neighbor SSB determinator 132a, and therefore, detailed descriptions thereof will be omitted. According to some example embodiments, operations described herein as being performed by the neighbor SSB determinator 132a and/or the alternate symbol timing offset generator 132b may be performed by processing circuitry.

The alternate symbol timing offset generator 132b may generate an alternate symbol timing offset using the neighbor SSB determined by the neighbor SSB determinator 132a. The symbol timing recovery controller 132 may perform symbol timing recovery based on the alternate symbol timing offset. The methods of operating the automatic frequency controller 131 discussed in association with FIGS. 7-9B may be identically or similarly applied to the symbol timing recovery controller 132. In other words, similarly to the automatic frequency controller 131, the symbol timing recovery controller 132 may select one of a target SSB and/or at least one neighbor SSB, which are received in an SSB period corresponding to a time when the best reception beam is changed to another reception beam as a result of updating the best reception beam, and may perform symbol timing recovery with respect to the changed reception beam.

In FIG. 12, it is assumed that the j-th SSB SSB_j,m is a target SSB, the i-th SSB SSB_i,m and the k-th SSB SSB_k,m are neighbor SSBs, the best reception beam is a first reception beam, and a reception beam to which the best reception beam is changed via a sweeping reception beam is a second reception beam. The horizontal direction in FIG. 12 does not indicate a time axis. In addition, the illustration of FIG. 12 is just an example, and embodiments are not limited thereto.

Referring to FIG. 12, a wireless communication device may receive the plurality of x-th through y-th SSBs SSB_x,m through SSB_y,m from a base station in an m-th SSB period, where "m" is an integer. In detail, the wireless communication device may receive neighbor SSBs, e.g., the x-th SSB SSB_x,m and the y-th SSB SSB_y,m via the first reception beam and may receive the target SSB, e.g., the j-th SSB SSB_j,m, via the second reception beam. The symbol timing recovery controller 132 may continuously perform symbol timing recovery on the first reception beam based on a symbol timing offset that is generated using a target SSB received in an SSB period before the m-th SSB period. However, as the first reception beam is changed to the second reception beam in the m-th SSB period, it may be desirable to determine whether the target SSB, e.g., the j-th SSB SSB_j,m, received via the second reception beam is suitable for a first symbol timing recovery STR1.

Accordingly, the symbol timing recovery controller 132 may determine whether to perform the first symbol timing recovery STR1 on the second reception beam using the target SSB, e.g., the j-th SSB SSB_j,m, when the first reception beam is changed to the second reception beam to update the best reception beam in the m-th SSB period. The symbol timing recovery controller 132 may generate a reception quality of the target SSB, e.g., the j-th SSB SSB_j,m, and determine whether to perform the first symbol timing recovery STR1 based on the reception quality. For example, the symbol timing recovery controller 132 may perform the first symbol timing recovery STR1 using the target SSB, e.g., the j-th SSB SSB_j,m, when the reception quality of the target SSB, e.g., the j-th SSB SSB_j,m, is equal to or higher than a reference quality. The symbol timing recovery controller 132 may generate a symbol timing offset using the target SSB, e.g., the j-th SSB SSB_j, m, and perform the first symbol timing recovery STR1 based on the symbol timing offset.

The symbol timing recovery controller 132 may perform a second symbol timing recovery STR2 and a third symbol timing recovery STR3 using the neighbor SSBs, e.g., the i-th SSB SSB_i,m and/or the k-th SSB SSB_k,m, when the reception quality of the target SSB, e.g., the j-th SSB beam in a certain SSB period, and each of symbol timing offsets, which are respectively generated (or estimated) using neighbor SSBs received via the best reception beam. The symbol timing recovery controller 132 may reflect the offset differences in a symbol timing recovery using at least one SSB selected from neighbor SSBs afterwards. In detail, the symbol timing recovery controller 132 may use the i-th and k-th offset differences diff_timing_i and diff_timing_k when generating (or estimating) alternate symbol timing offsets using neighbor SSBs, e.g., the i-th SSB SSB_i,m and the k-th SSB SSB_k,m, received in the m-th SSB period in FIG. 5.

In detail, the symbol timing recovery controller 132 may apply the offset differences using Equation 4:

$$f_{STR}(\Delta t_{Alternate}) \text{ where } \Delta t_{Alternate} = \tag{4}$$

$$\Delta t_{SSB_{j,m-1}} + \frac{1}{\sum\limits_{y \in Neighbor\ SSBs} \sigma_{e(y)^{-2}}} \sum\limits_{x \in Neighbor\ SSBs} \frac{e(x)}{\sigma_{e(x)^{-2}}} \quad e(x) = \Delta t_{SSB_{-x,m}} - \Delta t_{SSB_{-x,m-1}}$$

SSB_j,m, is lower than the reference quality. In some embodiments, the symbol timing recovery controller 132 may select one of the i-th SSB SSB_i,m and/or the k-th SSB SSB_k,m and perform a symbol timing recovery corresponding to the selected neighbor SSB using the selected neighbor SSB.

Figure 13A:
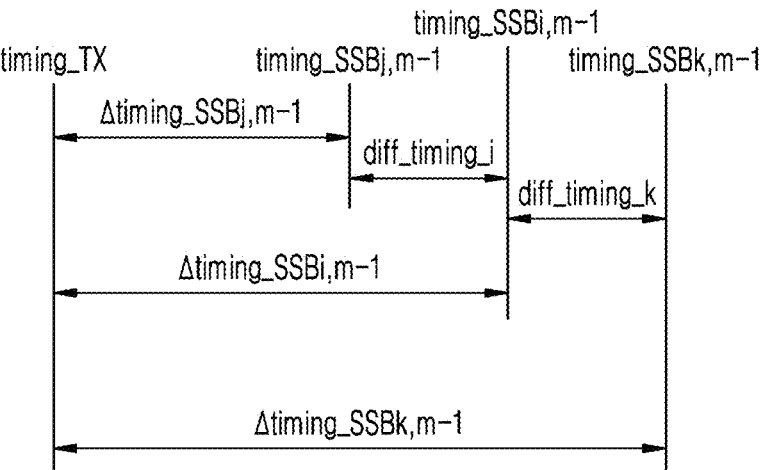
FIGS. 13A and 13B are diagrams for explaining a method of operating a symbol timing recovery controller, according to an example embodiment.
Figure 13B:
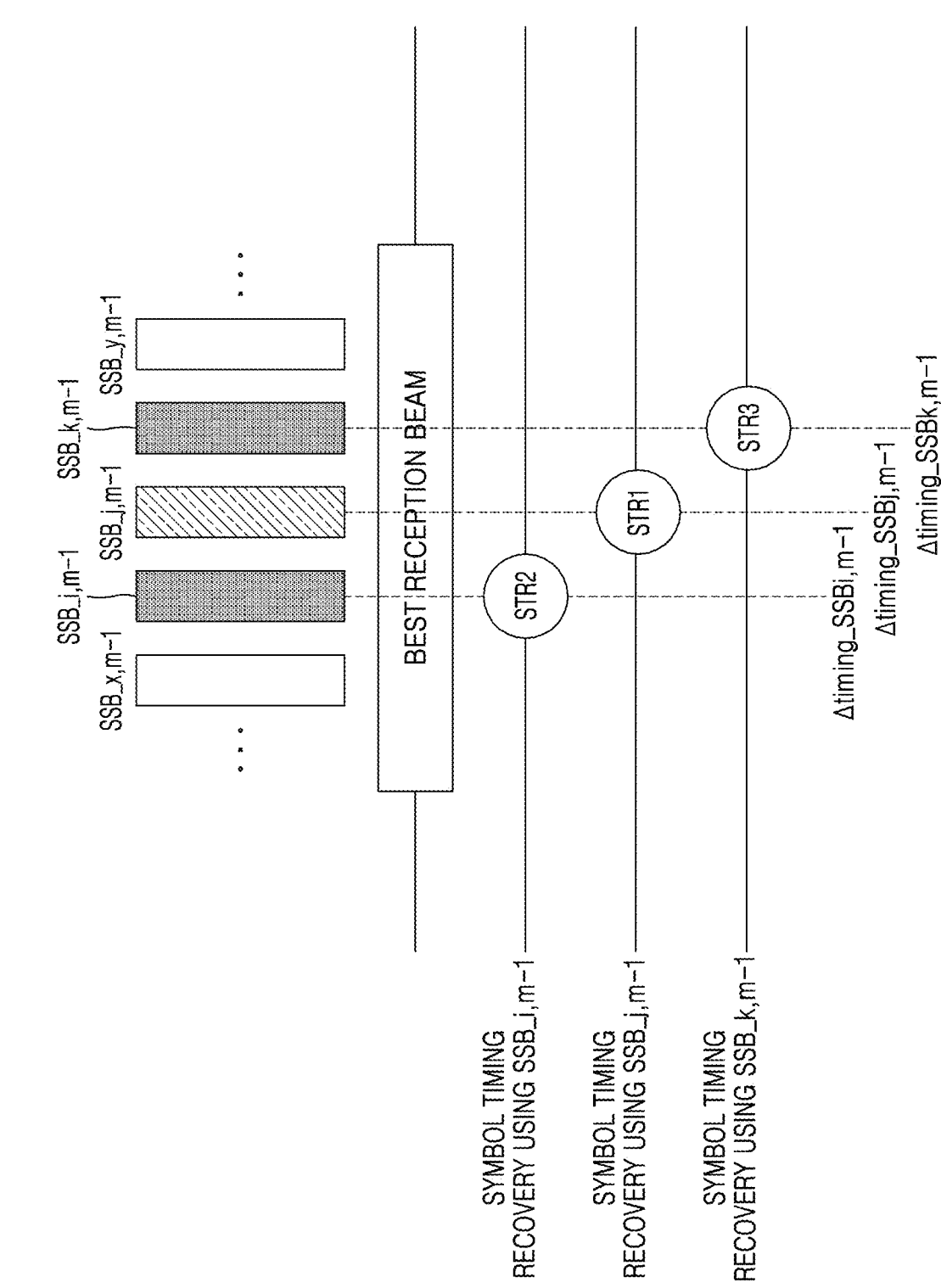

FIGS. 13A and 13B are diagrams for explaining a method of operating a symbol timing recovery controller, according to an example embodiment. FIG. 3 will also be referred to in the description below.

Referring to FIGS. 13A and 13B, a symbol timing offset between a transmission symbol timing timing_TX of a base station and a symbol timing of the wireless communication device 100 may be different for each SSB. For example, the wireless communication device 100 may receive the target SSB, e.g., the j-th SSB SSB_j,m−1, and the neighbor SSBs, e.g., the i-th SSB SSB_i,m−1 and the k-th SSB SSB_k,m−1, from a base station via the best reception beam (e.g., a first reception beam) in the (m−1)-th SSB period before the m-th SSB period; and a symbol timing offset Δtiming_SSBj,m−1 generated (or estimated) using the target SSB, e.g., the j-th SSB SSB_j,m−1, may be different from symbol timing offsets Δtiming_SSBi,m−1 and Δtiming_SSBk,m−1 generated (or estimated) using the neighbor SSBs, e.g., the i-th SSB SSB_i,m−1 and the k-th SSB SSB_k,m−1. For example, an i-th offset difference diff_timing_i may be between the symbol timing offset Δtiming_SSBj,m−1 generated (or estimated) using the target SSB, e.g., the j-th SSB SSB_j,m−1, and the symbol timing offset Δtiming_SSBi, m−1 generated (or estimated) using the i-th SSB SSB_i,m−1; and a k-th offset difference diff_timing_k may be between the symbol timing offset Δtiming_SSBj,m−1 generated (or estimated) using the target SSB, e.g., the j-th SSB SSB_j, m−1, and the symbol timing offset Δtiming_SSBk,m−1 generated (or estimated) using the k-th SSB SSB_k,m−1.

The symbol timing recovery controller 132 may generate the i-th and k-th offset differences diff_timing_i and diff_timing_k using the symbol timing offsets Δtiming_SSBj,m−1, Δtiming_SSBi,m−1, and Δtiming_SSBk,m−1.

According to an example embodiment, the symbol timing recovery controller 132 may generate an offset difference between a symbol timing offset, which is generated (or estimated) using a target SSB received via the best reception Here, when the quality of $\Delta t_{SSB_{-x,m}} - \Delta t_{SSB_{-x,m-1}}$ is not known, a simple arithmetic mean may be calculated using Equation 5:

$$\Delta t_{Alternate} = \Delta t_{SSB_{-j,m-1}} + \frac{1}{|Neighbor\ SSBs|} \sum\limits_{x \in Neighbor\ SSBs} e(x) \tag{5}$$

When there are a plurality of neighbor SSBs SSB_x, the symbol timing recovery controller 132 may generate an alternate symbol timing offset $\Delta t_{Alternate}$ by performing a calculation on a symbol timing offset $\Delta t_{SSB_{-j,m-1}}$ corresponding to the target SSB, e.g., the j-th SSB SSB_j,m−1, and a symbol timing offset $\Delta t_{SSB_{-x,m-1}}$ corresponding to a neighbor SSB, e.g., the x-th SSB SSB_x,m−1, in the (m−1)-th SSB period (or a random SSB period) and a symbol timing offset $\Delta t_{SSB_{-x,m}}$ corresponding to a neighbor SSB, e.g., the x-th SSB SSB_x,m, in the m-th SSB period, based on Equation 4 or 5. The symbol timing recovery controller 132 may perform a symbol timing recovery based on an application result (e.g., the alternate symbol timing offset $\Delta t_{Alternate}$).

Figure 14:
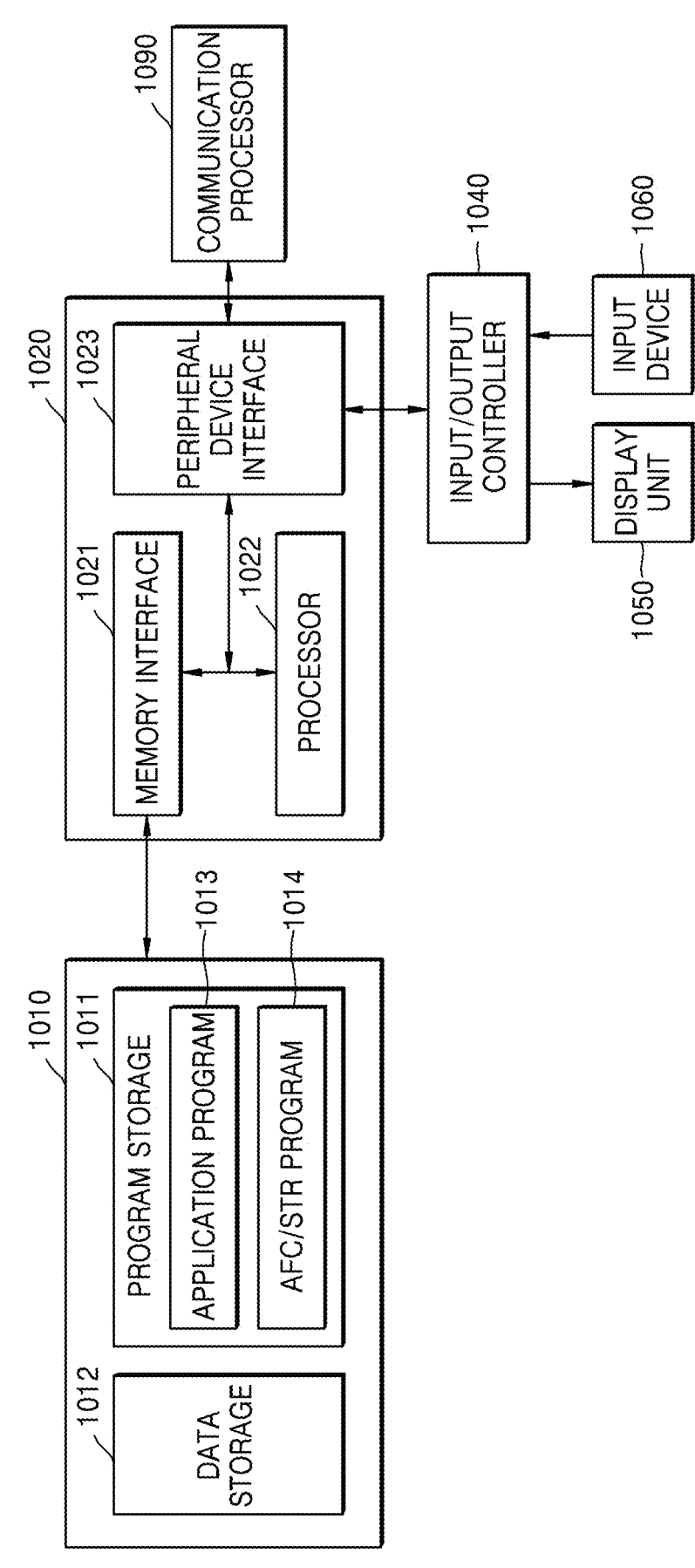
FIG. 14 is a block diagram of an electronic apparatus according to an example embodiment.

FIG. 14 is a block diagram of an electronic apparatus 1000 according to an example embodiment.

Referring to FIG. 14, the electronic apparatus 1000 may include a memory 1010, a processor unit 1020, an input/output controller 1040, a display unit 1050, an input device 1060, and/or a communication processor 1090. Here, there may be a plurality of memories 1010. Each element will be described below.

The memory 1010 may include a program storage 1011, which may store a program for controlling operations of the electronic apparatus 1000, and/or a data storage 1012, which may store data generated during execution of the program. The data storage 1012 may store data used for execution of an application program 1013 and/or an automatic frequency control (AFC)/symbol timing recovery (STR) program 1014. The program storage 1011 may include the application program 1013 and/or the AFC/STR program 1014. Here, a program included in the program storage 1011 may be a set of instructions and expressed as an instruction set.

The application program 1013 may include an application program operating in the electronic apparatus 1000. In other words, the application program 1013 may include instructions of an application run by processing circuitry (e.g., a processor 1022). When the best reception beam is changed to another reception beam as a result of updating the best reception beam, according to embodiments, the AFC/STR program 1014 may select one of a target SSB and/or at least one neighbor SSB, which are received in an SSB period corresponding to the time of beam changing, and perform an automatic frequency control and/or a symbol timing recovery on the changed reception beam using the selected SSB.

A peripheral device interface 1023 may control connection among an input/output peripheral device of a base station, the processor 1022, and a memory interface 1021. The processor 1022 may control a base station to provide a service using at least one software program. At this time, the processor 1022 may execute at least one program stored in the memory 1010 such that a service corresponding to the program may be provided.

The input/output controller 1040 may provide an interface between an input/output device, such as the display unit 1050 and/or the input device 1060, and the peripheral device interface 1023. The display unit 1050 may display status information, input text, a moving picture, and/or a still picture. For example, the display unit 1050 may display information on an application program run by the processor 1022.

The input device 1060 may provide input data, which may be generated by the selection of the electronic apparatus 1000, to the processor unit 1020 through the input/output controller 1040. The input device 1060 may include a keypad, which includes at least one hardware button, and/or a touch pad sensing touch information. For example, the input device 1060 may provide touch information, such as a touch, a movement of the touch, and/or the release of the touch, detected through a touch pad to the processor 1022 through the input/output controller 1040. The electronic apparatus 1000 may include the communication processor 1090 that may perform communication functions for voice communication and data communication. The communication processor 1090 may include at least one phased array. The AFC/STR program 1014 may control the communication processor 1090 when the best reception beam is updated according to embodiments.

Conventional devices for performing beamforming in 5G communication systems skip performance of automatic frequency control and/or symbol timing recovery when the reception quality of a target SSB is not satisfactory while a reception beam is being changed. By skipping performance of automatic frequency control and/or symbol timing recovery in such situations, the conventional devices degrade the communication performance between the conventional devices within the 5G communication systems.

However, some example embodiments describe a wireless communication device 100 that may perform automatic frequency control and/or symbol timing recovery using a neighbor SSB, instead of skipping the performance of automatic frequency control and/or symbol timing recovery, when the reception quality of the target SSB is not satisfactory. Accordingly, the wireless communication device 100 overcomes the above-mentioned deficiencies of the conventional devices to prevent or reduce degradation of communication performance.

While the inventive concepts have been particularly shown and described with reference to embodiments thereof, it will be understood that various changes in form and details may be made therein without departing from the spirit and scope of the following claims.

What is claimed is:

1. A method of operating a wireless communication device which communicates with a base station via a selected beam pair including a selected transmission beam and a selected reception beam, the method comprising:

receiving a plurality of neighbor synchronization signal blocks (SSBs) from the base station via a first reception beam among a plurality of reception beams, the plurality of neighbor SSBs being transmitted via a subset of a plurality of transmission beams, the subset of the plurality of transmission beams not including the selected transmission beam, and the selected transmission beam being a first transmission beam among the plurality of transmission beams;

receiving a target SSB via a second reception beam among the plurality of reception beams in response to changing the selected reception beam from the first reception beam to the second reception beam, the target SSB being transmitted via the first transmission beam; and performing at least one of automatic frequency control or symbol timing recovery on the second reception beam using the plurality of neighbor SSBs received by the first reception beam.

2. The method of claim 1, wherein the target SSB and the plurality of neighbor SSBs are received in one SSB period.

3. The method of claim 2, wherein a reception quality of each of the plurality of neighbor SSBs is equal to or higher than a reference quality.

4. The method of claim 3, wherein the reference quality is set based on a reception quality of at least one of the plurality of neighbor SSBs received in the one SSB period and a reception quality of at least one other target SSB received in at least one other SSB period.

5. The method of claim 4, wherein the reception quality of each of the plurality of neighbor SSBs includes at least one of a reference signal received power (RSRP) or a signal-to-noise ratio (SNR).

6. The method of claim 1, wherein the performing at least one of automatic frequency control or symbol timing recovery comprises:

performing the at least one of automatic frequency control or symbol timing recovery on the second reception beam using the plurality of neighbor SSBs in response to a reception quality of the target SSB being lower than a reference quality.

7. The method of claim 6, wherein the performing at least one of automatic frequency control or symbol timing recovery comprises:

selecting a neighbor SSB having a highest reception quality among the plurality of neighbor SSBs to obtain a selected neighbor SSB;

generating at least one of an alternate frequency offset or an alternate symbol timing offset using the selected neighbor SSB; and performing the at least one of automatic frequency control or symbol timing recovery based on the at least one of the alternate frequency offset or the alternate symbol timing offset.

8. The method of claim 6, wherein the performing at least one of automatic frequency control or symbol timing recovery comprises:

generating at least one of alternate frequency offsets or alternate symbol timing offsets using the plurality of neighbor SSBs;

calculating at least one of a first average of the alternate frequency offsets or a second average of the alternate symbol timing offsets; and performing the at least one of automatic frequency control or symbol timing recovery based on the at least one of the first average or the second average.

9. The method of claim 6, further comprising:

generating at least one of a frequency offset difference or a symbol timing offset difference between the target SSB and each of the plurality of neighbor SSBs using a plurality of SSBs received from the base station in a certain SSB period, wherein the performing at least one of automatic frequency control or symbol timing recovery includes, generating at least one frequency offset or at least one symbol timing offset using the plurality of neighbor SSBs, generating at least one of, an alternate frequency offset by applying the frequency offset difference to the at least one frequency offset, or an alternate symbol timing offset by applying the symbol timing offset difference to the at least one symbol timing offset, and performing the at least one of automatic frequency control or symbol timing recovery based on the at least one of the alternate frequency offset or the alternate symbol timing offset.

10. The method of claim 1, wherein the changing changes the selected reception beam from the first reception beam to the second reception beam according to a variable communication environment of the wireless communication device.

11. The method of claim 1, wherein the performing at least one of automatic frequency control or symbol timing recovery performs the at least one of automatic frequency control or symbol timing recovery on the second reception beam after at least one of automatic frequency control or symbol timing recovery has been performed on the first reception beam and in response to the changing the selected reception beam from the first reception beam to the second reception beam.

12. A wireless communication device comprising:

a plurality of antennas configured to receive a radio frequency (RF) signal from a base station via a plurality of reception beams;

a local oscillator configured to generate an oscillation signal having a local oscillation frequency; and processing circuitry configured to, generate a baseband signal using the RF signal and the oscillation signal, the baseband signal including a target synchronization signal block (SSB) received via a first reception beam among the plurality of reception beams and at least one neighbor SSB received via a second reception beam among the plurality of reception beams in response to a selected reception beam changing from the second reception beam to the first reception beam, determine at least one first SSB from among the at least one neighbor SSB and the target SSB based on a determination of whether a reception quality of the target SSB is lower than a reference quality, and perform an automatic frequency control on the local oscillation frequency using the at least one first SSB.

13. The wireless communication device of claim 12, the processing circuitry is configured to:

perform a symbol timing recovery using the at least one first SSB.

14. The wireless communication device of claim 13, wherein the processing circuitry is configured to:

determine the at least one first SSB to be the at least one neighbor SSB based on the reception quality of the target SSB being lower than the reference quality; and perform at least one of the automatic frequency control or the symbol timing recovery on the second reception beam using the at least one first SSB.

15. The wireless communication device of claim 14, wherein the reception quality of the target SSB includes at least one of a reference signal received power (RSRP) or a signal-to-noise ratio (SNR).

16. The wireless communication device of claim 13, wherein the processing circuitry is configured to:

generate at least one of an alternate frequency offset or an alternate symbol timing offset using a first neighbor SSB, the first neighbor SSB being one neighbor SSB based on the at least one neighbor SSB including only the one neighbor SSB, or a neighbor SSB having a highest reception quality among a plurality of neighbor SSBs based on the at least one neighbor SSB including the plurality of neighbor SSBs; and perform at least one of the automatic frequency control or the symbol timing recovery based on the at least one of the alternate frequency offset or the alternate symbol timing offset.

17. The wireless communication device of claim 13, wherein the at least one neighbor SSB includes a plurality of neighbor SSBs; and the processing circuitry is configured to:

generate at least one of alternate frequency offsets or alternate symbol timing offsets using the plurality of neighbor SSBs, calculate at least one of a first average of the alternate frequency offsets or a second average of the alternate symbol timing offsets, and perform at least one of the automatic frequency control or the symbol timing recovery based on the at least one of the first average or the second average.

18. The wireless communication device of claim 13, wherein the processing circuitry is configured to:

continuously perform at least one of the automatic frequency control or the symbol timing recovery on the second reception beam; and perform the at least one of the automatic frequency control or the symbol timing recovery on the second reception beam after the at least one of the automatic frequency control or the symbol timing recovery is performed on the first reception beam and in response to the selected reception beam changing from the first reception beam to the second reception beam.

19. A wireless communication device comprising:

a plurality of antennas configured receive a radio frequency (RF) signal from a base station via a plurality of reception beams;

a local oscillator configured to generate an oscillation signal having a local oscillation frequency;

an RF circuit configured to output a baseband signal based on the RF signal and the oscillation signal; and

a processing circuitry configured to, change a selected reception beam from a first reception beam among the plurality of reception beams to a second reception beam among the plurality of reception beams, the baseband signal including a target synchronization signal block (SSB) received via the selected reception beam based on the selected reception beam being changed to the second reception beam, and at least one neighbor SSB being received via the first reception beam, determine at least one first SSB from among the at least one neighbor SSB and the target SSB by comparing a reception quality of the target SSB and a reference quality to obtain a determination result, and perform an automatic frequency control on the local oscillation frequency using the at least one first SSB based on the determination result.

20. The wireless communication device of claim 19, wherein the processing circuitry is configured to:

perform a symbol timing recovery using the at least one first SSB based on the determination result.

* * * * *